United States Patent [19]

Bracegirdle

[11] Patent Number: 4,932,785
[45] Date of Patent: Jun. 12, 1990

[54] AGGREGATE DRYING SYSTEM WITH IMPROVED AGGREGATE DRYER AND MASS FLOW APPARATUS

[76] Inventor: Paul E. Bracegirdle, 559 Fairman La., Langhorne, Pa. 19047

[21] Appl. No.: 209,616

[22] Filed: Jun. 21, 1988

[51] Int. Cl.$^5$ .......................... B28C 5/46; B01F 15/02; B01F 15/06; B65D 88/68
[52] U.S. Cl. ........................................... 366/7; 366/23; 366/25; 366/30; 366/32; 366/147; 366/148; 366/182; 34/165; 165/164; 165/920; 222/146.2; 222/290
[58] Field of Search ...................... 366/2, 3, 4, 6, 7, 9, 366/10, 22, 23-26, 41, 52, 61, 67, 68, 30, 144, 32, 147-149, 189, 341, 347, 348, 349, 184, 192, 193, 42, 50, 182; 222/146.2, 146.4, 146.5, 290, 293, 267; 34/165, 167, 177; 110/224, 226; 165/920, 164; 126/343.5 R, 343.5 A

[56] References Cited

U.S. PATENT DOCUMENTS

| Re. 29,496 | 12/1977 | Dydzyk . | |
|---|---|---|---|
| Re. 32,206 | 7/1986 | Bracegirdle . | |
| 409,331 | 8/1889 | McFarland | 222/267 |
| 625,358 | 5/1899 | Schock . | |
| 886,518 | 5/1908 | Klementis et al. | 34/165 |
| 1,032,132 | 7/1912 | Gormley | 222/281 |
| 1,097,084 | 5/1914 | Eichelberger | 366/4 |
| 1,138,291 | 5/1915 | Hilliard . | |
| 1,188,081 | 6/1916 | Kirschbraun . | |
| 1,291,981 | 1/1919 | Madsen | 366/42 |
| 1,447,722 | 3/1923 | Henriksen | 222/252 |
| 1,582,798 | 4/1926 | Stephens . | |
| 2,227,634 | 1/1941 | Dalin | 34/165 |
| 2,491,194 | 12/1949 | McShea . | |
| 2,508,195 | 5/1950 | Seaman et al. . | |
| 2,519,148 | 8/1950 | McShea . | |
| 2,603,383 | 7/1952 | Wilson . | |
| 2,622,342 | 12/1952 | Goulounes et al. . | |
| 2,900,109 | 8/1959 | Hoopes et al. . | |
| 2,907,499 | 10/1959 | Agronin . | |
| 2,977,955 | 4/1961 | Altenburg . | |
| 3,091,369 | 5/1963 | Sackett, Sr. | 366/22 |
| 3,131,035 | 4/1964 | Erickson . | |
| 3,181,488 | 5/1965 | Roe et al. | 34/177 |
| 3,387,751 | 6/1968 | Olsson | 222/267 |
| 3,499,678 | 3/1970 | Richler . | |
| 3,515,374 | 6/1970 | Curley | 366/193 |
| 3,627,014 | 12/1971 | Akashi et al. . | |
| 3,633,563 | 1/1972 | Osborn | 126/343.5 A |
| 3,659,583 | 5/1972 | Martin . | |
| 3,661,365 | 5/1972 | Cloud, Jr. . | |
| 3,780,991 | 12/1973 | Evans et al. | 366/192 |

(List continued on next page.)

FOREIGN PATENT DOCUMENTS

| 213069 | 5/1956 | Australia . | |
|---|---|---|---|
| 71706 | 10/1950 | Denmark | 222/252 |
| 12494 | 7/1880 | Fed. Rep. of Germany . | |
| 363901 | 10/1938 | Italy . | |

OTHER PUBLICATIONS

McMaster-Carr Supply Company Catalog; Catalog No. 85; Date 1979; pp. 216, 1868 and 1918.
"An Energy Efficient, Pollution Free Mixing Process", Iowa Manufacturing Co.
J. Don Brock, "Energy Conservation on Asphalt Plants".
Philip F. Dickson, "Heating and Drying of Aggregate—Capture of Waste Heat".

*Primary Examiner*—Harvey C. Hornsby
*Assistant Examiner*—Joseph S. Machuga
*Attorney, Agent, or Firm*—Panitch Schwarze Jacobs & Nadel

[57] ABSTRACT

This invention relates to an improved aggregate drying apparatus and method where the dried aggregate is particularly useful for making hot mix asphalt. In accordance with the system, heat typically lost in exhaust gases and moisture evaporated in a heater is recovered to dry and preheat the aggregate. The invention also relates to novel components used in the system, including an improved aggregate dryer and an improved mass flow apparatus for use in an aggregate dryer or otherwise in aggregate feed bins.

33 Claims, 11 Drawing Sheets

U.S. PATENT DOCUMENTS

| | | | |
|---|---|---|---|
| 3,802,020 | 4/1974 | Stone et al. . | |
| 3,809,373 | 5/1974 | Brock . | |
| 4,052,491 | 10/1977 | Lefevre . | |
| 4,081,109 | 3/1978 | Kugle et al. | 366/42 |
| 4,096,588 | 6/1978 | Mendenhall | 366/23 |
| 4,126,519 | 11/1978 | Murray . | |
| 4,190,370 | 2/1980 | Brock et al. | 366/25 |
| 4,196,827 | 4/1980 | Leafdale . | |
| 4,207,065 | 6/1980 | Ackermann et al. . | |
| 4,218,832 | 8/1980 | Daniels . | |
| 4,229,109 | 10/1980 | Benson | 366/24 |
| 4,245,915 | 1/1981 | Bracegirdle . | |
| 4,249,890 | 2/1981 | Graham . | |
| 4,254,898 | 3/1981 | Davis | 222/290 |
| 4,277,180 | 7/1981 | Munderich | 366/24 |
| 4,279,592 | 7/1981 | Grant . | |
| 4,375,959 | 3/1983 | Powell | 110/224 |
| 4,387,996 | 6/1983 | Mendenhall | 366/4 |
| 4,390,282 | 6/1983 | Bake | 366/41 |
| 4,428,677 | 1/1984 | Schreiter, Jr. | 366/41 |
| 4,477,250 | 10/1984 | Brashears et al. | 126/343.5 A |
| 4,479,591 | 10/1984 | Burkhart et al. | 366/193 |
| 4,583,301 | 4/1986 | Crowley et al. | 34/177 |
| 4,600,379 | 7/1986 | Elliott . | |
| 4,784,216 | 11/1988 | Bracegirdle et al. . | |

AGGREGATE DRYING SYSTEM WITH IMPROVED AGGREGATE DRYER AND MASS FLOW APPARATUS

BACKGROUND OF THE INVENTION

1. Field of the Invention

The present invention relates to an aggregate drying system, as well as components used therein, including an improved aggregate dryer and mass flow apparatus. More particularly, the present invention is directed to a system for making asphalt concrete, sometimes referred to as hot-mix asphalt (hereinafter "HMA"), in which heat typically lost in exhaust gases and moisture evaporated in a heater is recovered to dry and preheat the aggregate, comprising rocks, gravel and sand used in making the HMA.

In general, the presently preferred use contemplated for the system of the present invention is to heat and dry aggregate used to make HMA. The aggregate usually contains a substantial amount of moisture which can be reduced using the apparatus of the present invention The novel components used in the system include an aggregate feed bin having a roller assembly and adjustable proportioning means for proportioning the amount of aggregate being discharged. The feed bin for enhancing mass flow of aggregate can be used not only in the system of the present invention involving HMA, but may also be used as a cold feed bin to improve the mass flow of any aggregate material from the feed bin.

The present invention also relates to an improved heater bin for heating aggregate material, as well as the hollow heat exchange plates used therein.

The components of the present invention, considered in combination or independently, represent improvements over current and prior art equipment used in drying aggregate and for retaining and discharging aggregate from feed bins.

2. Description Of The Prior Art

Along with the entire asphalt paving industry, the inventor has been working for several years to develop systems for efficiently and economically recovering heat from steam or combustion gas used in a primary or secondary heater for HMA or aggregate, particularly where the heater is a direct fired drum mixer where the heat source is a fossil fuel burner. None of the prior art systems, however, have proven to be completely successful in the varying and rapidly changing situations in which they are used. Thus, for example, when the price of fuel is high, one type of system which may be expensive to manufacture may be economical to purchase and operate. However, in times when the cost of fuel is relatively low, the relatively high manufacturing costs and purchase price cannot be justified on a commercial basis.

One prior art system is disclosed in the inventor's U.S. Pat. No. 4,245,915, entitled "Apparatus For Making Asphalt Concrete," and RE 32,206, entitled "Process for Making Asphalt Concrete." These patents relate to a system for indirectly preheating aggregate in a storage bin using steam evolved during a subsequent heating step, typically including heating a mixture of aggregate and binder. Copending U.S. patent application Ser. No. 905,367, filed Sept. 8, 1986, now U.S. Pat. No. 4,784,216, entitled "Heating and/or Drying Apparatus," in which the inventor herein is named as a coinventor, is directed to another system for indirectly heating or preheating aggregate in a storage bin, preferably using as a source of heat, steam generated from a different type of heater compared to the heater disclosed in the above-identified patents.

U.S. Pat. No. 4,375,959 of Powell, entitled "Waste Heat Recovery in Asphalt Mixing Plant," discloses a system for making HMA using a direct fired dryer in which a portion of the heat in the dryer exhaust gases is used to vaporize water in the process of preheating aggregate and thereby recover the heat in the exhaust gases travelling through ducts extending serially through the aggregate cold feed bins. Water injection is used to initiate condensation of water vapor in the exhaust gases.

There are other examples of prior art systems which dry various aggregate materials. However, none of the systems described specifically above or of which the inventor is otherwise aware in the prior art are believed to be as effective as the system of the present invention, in which a portion of combustion gas, and the heat contained therein, is recycled to the heater used in a direct fired heating system. A fuel savings of about 33% and an increase in system production rate of about 33% compared to standard drum mix processes are expected by recycling the exhaust gases from the drum mixer through the cold feed bins to preheat the aggregate and then recycling a portion back to the drum mixer. Not only does the system of the present invention make use of the energy value of moisture or other liquid contained in the material to be dried, but also, the system of the present invention produces substantially no atmospheric pollution and recycles a portion of the heat energy contained in the exhaust gases to the burner, all using components which are cost effective to manufacture, purchase and use.

In addition, enhanced mass flow is obtained using the feed bin of the present invention, whether the feed bin is used as a cold feed bin or modified to contain hollow heating plates to preheat the aggregate. The feeder bin may also be used as a crusher/sizer, if desired, by appropriately adjusting the adjustable proportioning means of the mass flow enhancing means.

SUMMARY OF THE INVENTION

One aspect of the present invention relates to a feed bin for enhancing the mass flow of aggregate material therefrom comprising a bin housing for receiving the aggregate material and having opposed front and rear walls connected to opposed side walls, and an open bottom for discharging the aggregate material; a roller assembly comprising at least one roller mounted generally horizontally adjacent to the bottom of the bin housing and being rotatably supported on the housing, the roller having a plurality of longitudinal chambers for receiving a portion of the aggregate material; driving means for rotating the roller to cause the aggregate material in the chambers of the roller to be discharged from the bottom of the bin housing; and vertically adjustable proportioning means supported from the bin housing alongside the roller for cooperating with the roller in controlling the discharge of the aggregate material from the bin.

In a preferred embodiment, the proportioning means is mounted adjacent to the bottom of the bin and adjacent to the roller and being supported by a vertically adjustable mounting assembly, the mounting assembly including a stationary support secured to each of the front and rear walls, a movable support secured to the proportioning means and a raising and lowering means secured to the stationary support and to the movable support to raise and lower the proportioning means with respect to the roller to thereby control the amount of aggregate material passing between the roller and the proportioning means to be discharged from the bottom of the bin housing.

Another aspect of the present invention relates to a heater bin for heating aggregate material, comprising a bin housing having opposite end walls and side wall sloping downwardly and inwardly to a discharge opening extending between the end walls; a plurality of heating plates secured in the bin housing in spaced apart relation; discharge means supported from the housing at the discharge opening for moving aggregate through the bin housing and through the discharge opening in a mass flow.

Another aspect of the present invention concerns a heater bin for heating aggregate material comprising a bin housing having opposed front and rear walls connected to opposed first and second external side walls, and to opposed first and second internal side walls, the internal side walls being spaced internally within the housing from the respective first and second external side walls to define a first chamber between the first internal and external side walls and a second chamber between the second internal and external side walls; a plurality of supports for supporting the bin housing to allow the aggregate material to be discharged from a bottom portion thereof; a plurality of hollow heat exchange plates adapted to contain heat exchange fluid, each heat exchange plate including opposed major surfaces connected along top and bottom edges by top and bottom walls, respectively, opposed ends of the plate being open, the plates being vertically disposed substantially within the bin housing with the first and second major surfaces adjacent the opposed ends being connected to the respective first and second internal side wall such that a passageway is formed through the plates from the first chamber to the second chamber; heating means for heating the heat exchange fluid; and circulating means for circulating the heat exchange fluid from the first chamber through the plates and into the second chamber. Preferably, the heater bin includes the roller assembly, driving means and the adjustable proportioning means set forth in the first aspect above to enhance the mass flow of aggregate from the heater bin.

Still another aspect of the present invention relates to a hollow heat exchange plate for use in a heat exchange bin in which heat is indirectly exchanged between a heat exchange fluid within the hollow plate and aggregate material in the bin, the hollow plate comprising first and second opposed major surfaces connected in a fluid-tight manner along top and bottom edges by top and bottom walls, respectively, opposed ends of the plate being open, with one end serving as an inlet for the heat exchange fluid and the opposite end serving as an outlet for the heat exchange fluid, and internal strengthening means secured to inner surfaces of the major surfaces to strengthen the plate, the internal strengthening means being disposed within the plate to create flow channels through which the heat exchange fluid flows from the inlet end to the outlet end.

Yet another aspect of the present invention is directed to the overall system generally discussed above. This aspect relates to apparatus for heating aggregate comprising direct fired heating means for heating aggregate by directly contacting the aggregate with a heated gas, the heating means including a housing having an aggregate inlet, an aggregate outlet, a heating gas inlet and a heating gas outlet; particulate removing means for removing particulate material from the heating gas exiting the heating means and including a heating gas inlet and a heating gas outlet; aggregate preheating means for indirectly preheating the aggregate using the heat contained in the heating gas exiting the heating means, the aggregate preheating means comprising a bin and hollow heat exchange plates supported in the bin through which the heating gas passes, the hollow heat exchange plates having walls which contact the aggregate so as to indirectly preheat the aggregate, the hollow heat exchange plates each having a heating gas inlet and heating gas outlet; a plurality of conduits serially connecting the heating gas outlets to the heating gas inlets through which the heating gas flows from the heating means through the particulate removing means, then through the hollow heat exchange plates of the preheating means and back to the heating means; circulating means for circulating the heating gas through the plurality of conduits; gas proportioning means associated with the conduit connecting the gas outlet of the hollow heat exchange plates and the gas inlet of the heating means for controlling bleed off of a portion of the circulating heating gas to atmosphere; and a preheated aggregate conveyor means for conveying preheated aggregate from the preheater means to the heating means.

Still another aspect of the present invention relates to a method of making HMA including the steps of (a) heating and drying aggregate in a rotating drum wherein exhaust gases are created; (b) removing particulate matter from the exhaust gas; (c) then directing the exhaust gas through vertically oriented heating plates in an aggregate pre-heating bin housing; (d) returning at least a portion of the exhaust gas from the heating plates to the rotating drum; (e) moving aggregate through the pre-heating bin housing along the heating plates in a mass flow; and (f) feeding the pre-heated aggregate to the rotating drum.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
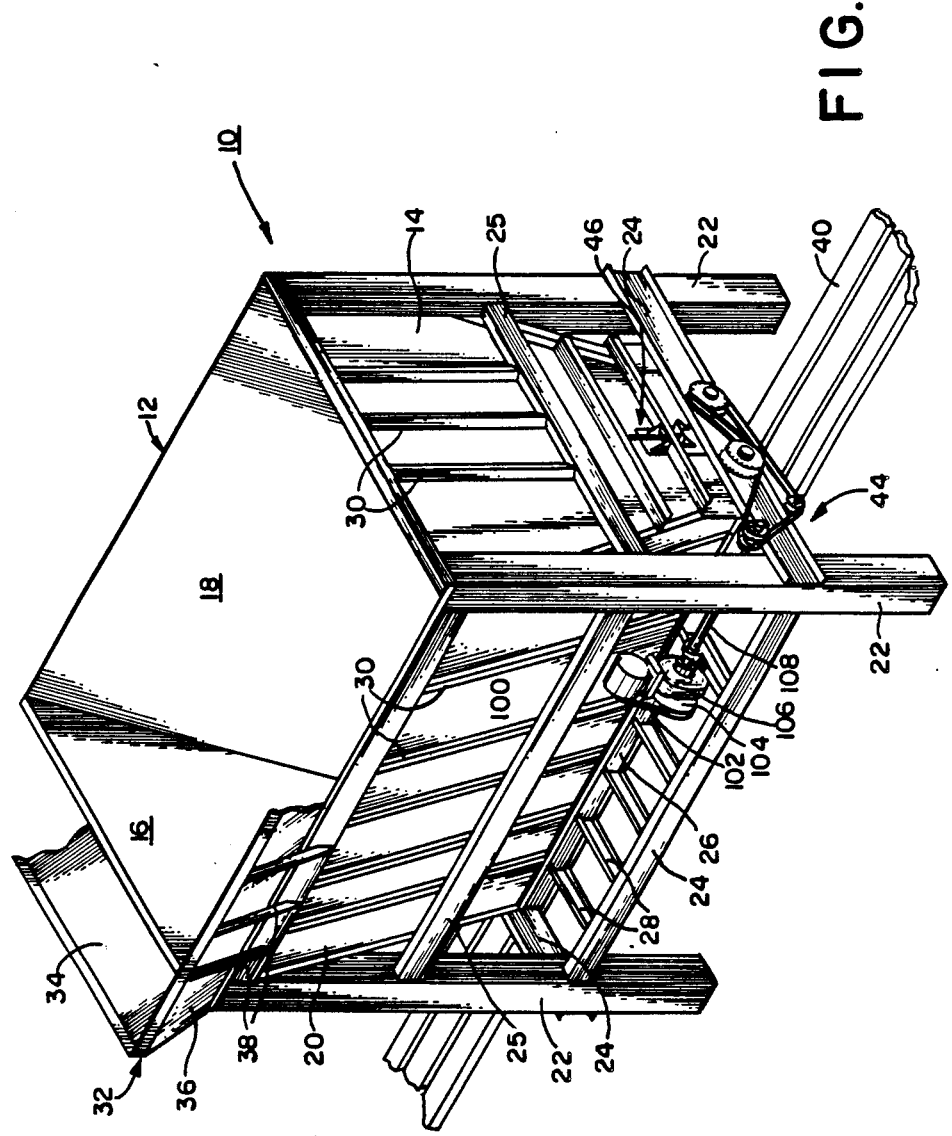
FIG. 1 is an isometric view of a feed bin for enhancing the mass flow of aggregate material therefrom according to the present invention.

Referring to the drawings in detail, wherein like elements are indicated by like numerals throughout the several views, there is shown in FIGS. 1 through 5 a feed bin 10 for enhancing the mass flow of aggregate material therefrom. As illustrated in FIGS. 1 through 5, the feed bin 10 according to the present invention is used as a cold feed bin.

The feed bin 10 includes a bin housing 12 having opposed front and rear walls 14 and 16, respectively, connected to opposed side walls 18 and 20, respectively.

At least one of the bin walls, preferably one of the side walls 18 and 20, and most preferably both side walls 18 and 20, are sloped in a downward and inward direction. The bin housing 12 is supported by a plurality of vertical support members 22 attached thereto in any suitable manner, such as by fasteners, welding, or the like. The vertical support members 22 are connected and reinforced by a plurality of lower stabilizer members 24 and upper stabilizer members 25. The bottom portion of the side walls 18 and 20 are supported by a longitudinal reinforcing member 26 which is connected by a plurality of transverse reinforcing members 28 to one of the longitudinal lower stabilizer members 24. The walls of the bin housing 12 may include a plurality of reinforcing ribs 30.

The feed bin 10 most typically is used with an open top as illustrated in FIG. 1 and includes the optional, but preferred, wing wall assembly 32. The wing wall assembly 32 comprises upstanding and obliquely outwardly angled opposed front and rear walls, only one of which is shown in FIG. 1 as rear wing wall 34, which are connected to upstanding and obliquely outwardly angled opposed side walls, only one of which is shown, partially broken away, as side wing wall 36. The wing walls may be connected to the upper portion of the walls of the bin housing 12, if desired, by nut and bolt fasteners or other suitable fastening means. Typically, the wing walls would include a plurality of reinforcing ribs 38.

Figure 2:
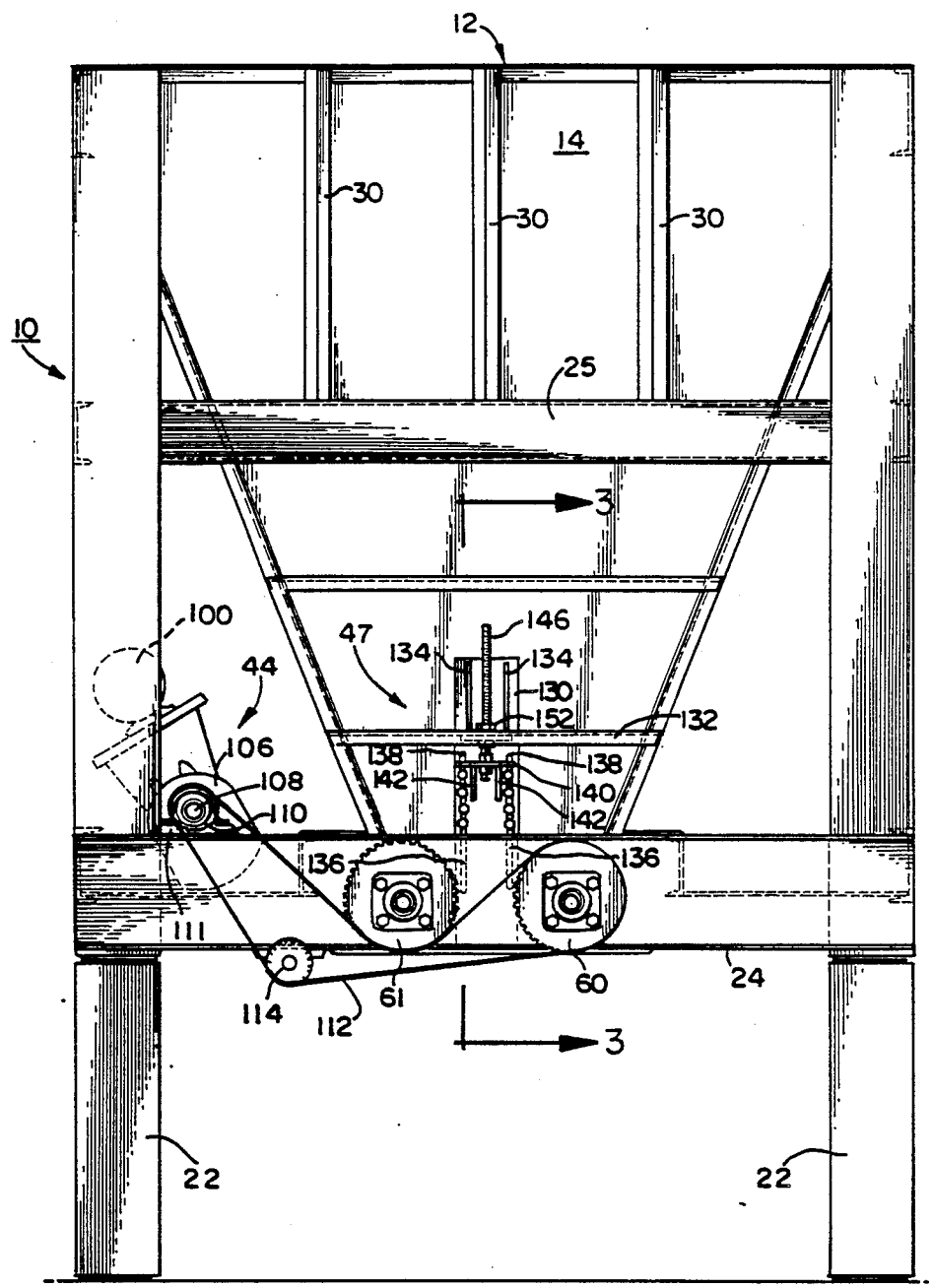
FIG. 2 is a front elevational view of the feed bin of FIG. 1, in which the optional upper wing wall has been removed and in which the gathering conveyor is not illustrated.
Figure 3:
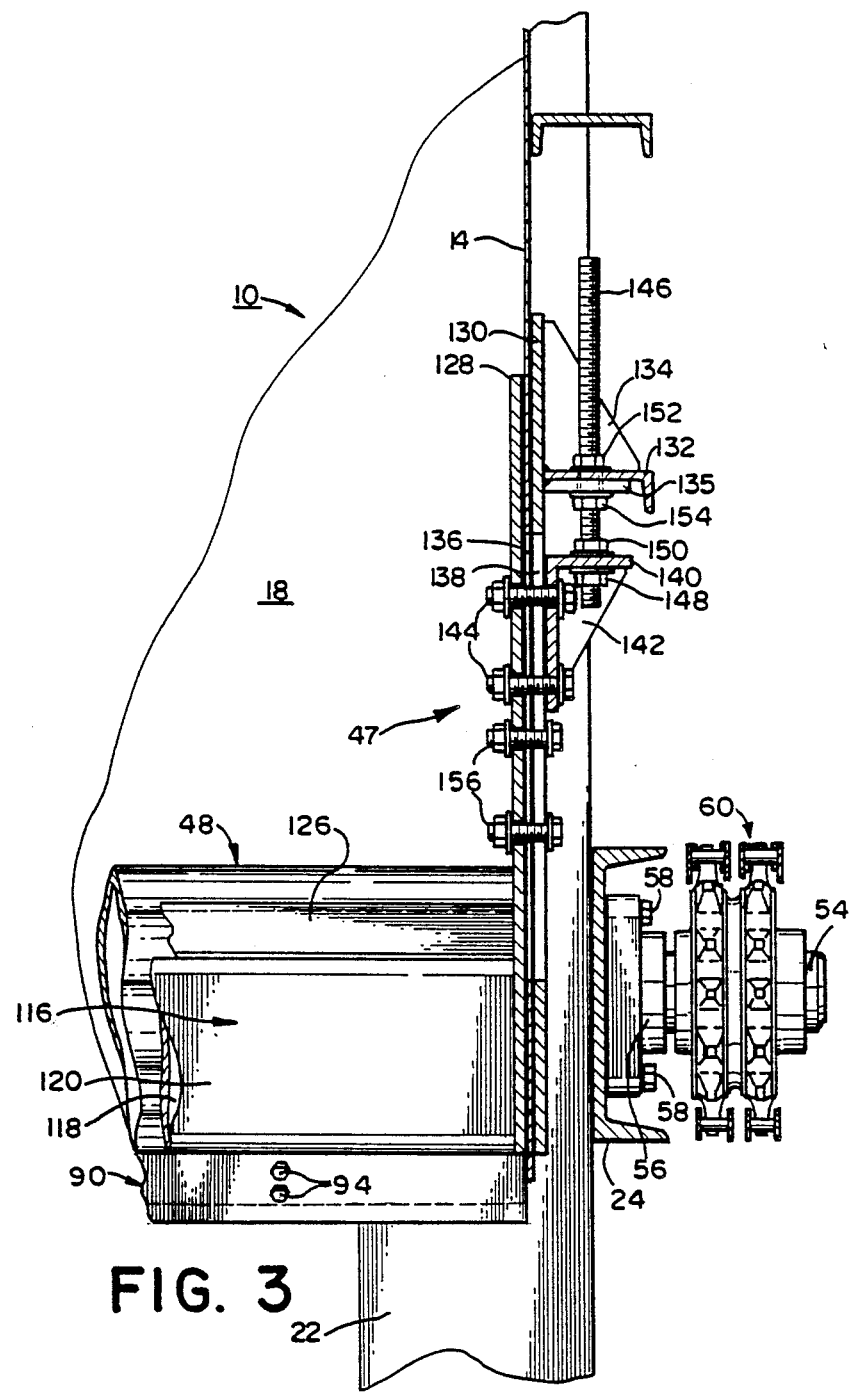
FIG. 3 is a vertical cross-sectional view of a portion of the bin of FIG. 1 taken along the lines 3—3 of FIG. 2, including a first embodiment of a height adjustment means for the adjustable proportioning means for proportioning the amount of aggregate being discharged from the bin housing.
Figure 4:
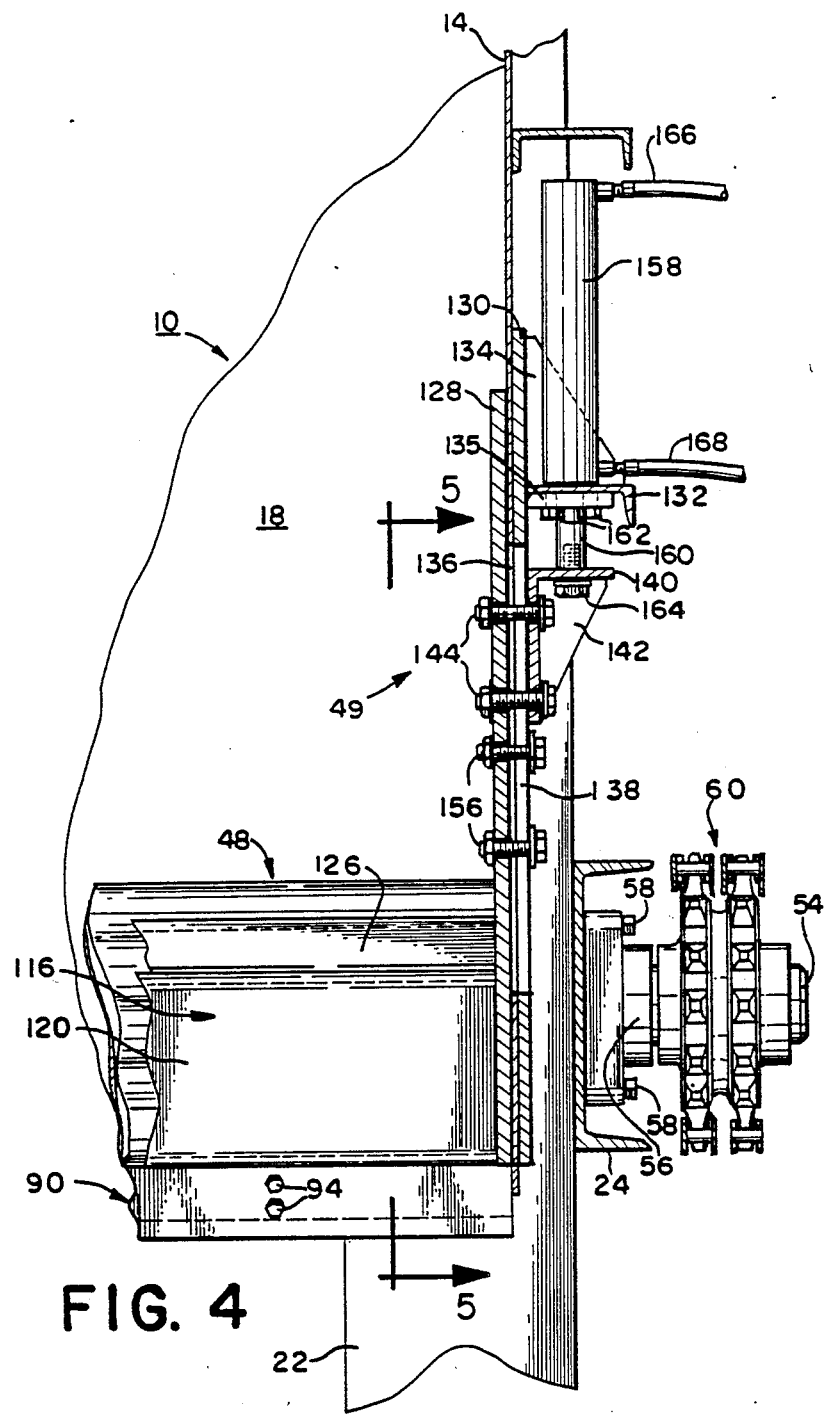
FIG. 4 is a vertical cross-sectional view of a portion of the bin of FIG. 1 taken along the lines 3—3 of FIG. 2, including a second embodiment of a height adjustment means for the adjustable bin proportioning means for proportioning the amount of aggregate being discharged from the bin housing.
Figure 5:
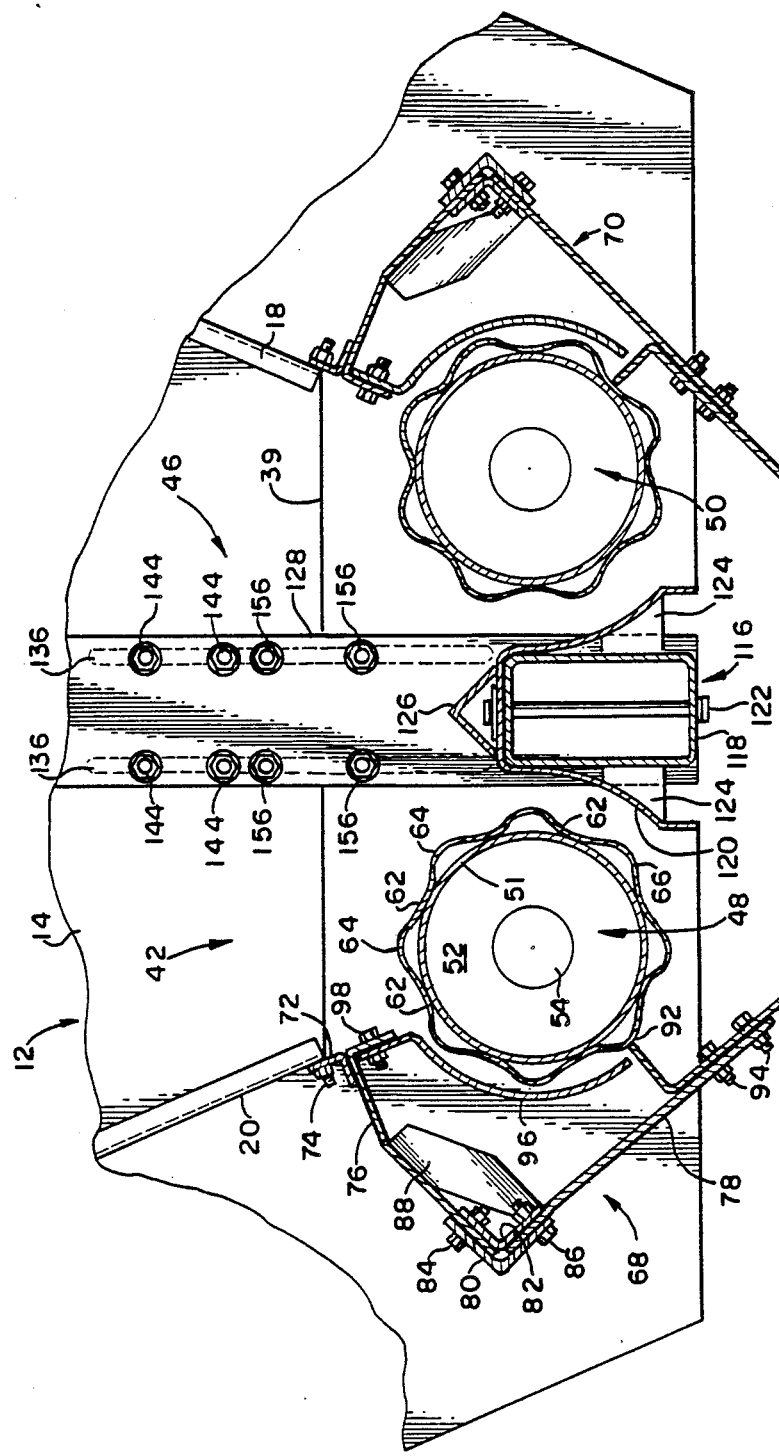
FIG. 5 is a vertical cross-sectional view of a portion of the feed bin illustrated in FIG. 1 taken along the lines 5—5 of FIG. 4.

The lower edges of the walls of the bin housing 12 define an open bottom 39 through which aggregate contained in the bin housing 12 may be discharged to a roller assembly 42, best illustrated in FIGS. 3, 4 and 5. The roller assembly 42 is driven by a driving means 44, best illustrated in FIGS. 1 and 2. The feed bin 10 also includes an adjustable proportioning means 46, best illustrated in FIGS. 1 through 5, for proportioning the amount of aggregate being discharged from the bin housing 12. There are two preferred embodiments for means for adjusting the height of the adjustable proportioning means, the first adjusting means embodiment 47 being illustrated in FIGS. 2 and 3, and the second adjusting means embodiment 49 being illustrated in FIG. 4.

With reference to FIGS. 3 through 5, and particularly to FIG. 5, the roller assembly 42 comprises at least one roller, and preferably, as illustrated, two rollers, a first roller 48 and a second roller 50. The rollers extend longitudinally between the front wall 14 and rear wall 16 below the discharge opening 39 in the bottom of the bin housing 12. The construction and mounting of the first roller 48 will now be described, it being understood that the construction and mounting of the second roller 50 are substantially identical thereto.

As best illustrated in FIG. 5, the roller 48 includes a tube 51. An end block 52 is inserted and welded in each end of the tube 51. A shaft 54 is inserted within a mating bore formed in the end block 52. The shaft 54 which will extend through the front wall of the bin housing 12 is longer than the corresponding shaft which will extend through the rear wall 16 of the bin housing 12 for purposes described hereinafter. The front and rear shafts 54 extend through the respective front and rear walls of the bin housing 12 and then through the lower stabilizing members 24. The shafts then extend through suitable heavy-duty roller bearing assemblies 56 mounted by a plurality of fasteners 58 to the lower stabilizing members 24. A double strand chain sprocket 60, 61 is mounted on the portion of the shaft 54 of each roller 48, 50, respectively, extending from the front of the feed bin 10. To aid in mounting the sprockets 60, 61 on the shafts 54, and to make it possible to time the shafts associated with both rollers 48 and 50, the shafts may be machined to form a keyway to correspond with a mating portion of the hub of the sprockets 60, 61. Set screws or other means for preventing relative rotation between the shaft and the sprocket could also be used.

The surface of the rollers 48 and 50 include a plurality of longitudinal chambers in the form of grooves 62 from front to back and alternating between longitudinal ridges 64, as best illustrated in FIG. 5. The alternating grooves 62 and ridges 64 preferably are formed by the surface configuration of a corrugated tube 66 which surrounds and is welded or otherwise attached to the tube 51 of roller 48. Although other constructions could be used to create longitudinal chambers corresponding to grooves 62 on the rollers, such as by welding longitudinal bar stock to the outer periphery of the tube 51, forming the longitudinal chambers in the form of the grooves adjacent to the longitudinal ridges 64 by means of the corrugated tube 66 is preferred due to the ease of cleaning the roller surface during operation and the cost of fabrication. The longitudinal grooves 62, in combination with the longitudinal ridges 64, are used to cause the aggregate within the bin housing 12 to flow as a mass when the rollers 48 and 50 are rotated toward the center. Thus, based on the view in FIG. 5, the roller 48 would rotate clockwise and the roller 50 would rotate counterclockwise. The aggregate would be discharged from between the rollers. Mass flow occurs as a portion of the aggregate along the entire length of the bottom of the bin housing 12 is discharged from the bottom of the bin.

With certain types of aggregate material, such as reclaimed asphalt pavement, sometimes referred to as "RAP", and where the feed bin 10 is used as a heating bin as described hereinafter, mass flow is enhanced by providing cleaning or scraping means for removing aggregate from the surface of the corrugated tube 66 which may tend to adhere to the surface. The scraping means includes scraper assemblies 68 and 70, associated with the rollers 48 and 50, respectively, as best illustrated in FIGS. 3, 4 and 5. The scraper assemblies 68 and 70 will be described with particular reference to FIG. 5. In general, only the scraper assembly 68 will be described, since the scraper assembly 70 is substantially identical thereto.

The scraper assembly 68 is attached to the feed bin 10 along the lower edge of the side wall 20 by a longitudinal L-shaped angle member 72 connected along the lower edge by welding or preferably, by a plurality of stud and nut fasteners 74, and a longitudinal bracket 76. The bracket 76 is attached along the bottom flange of the angle member 72 by welding, the use of fasteners, or any other suitable attachment means. A longitudinal resilient arm member 78 is attached to the longitudinal bracket 76 by outside and inside angle brackets 80 and 82, respectively, by a plurality of fasteners 84 and 86. A plurality of reinforcing members 88 may be fastened to the longitudinal bracket 76 and the resilient arm member 78 along their length.

A longitudinal, angled scraper blade 90, having a scraper edge 92 is fastened along the free edge of the resilient arm member 78 by a plurality of fasteners 94. As indicated in FIG. 5, the scraper edge 92 of the scraper assembly 68 is in contact with one of the ridges 64 of the corrugated surface of the roller 48. The corresponding scraper edge of the scraper assembly 70 is in contact with a groove 62 of the corrugated surface of the roller 50. The resilient arm member 78, preferably formed from spring steel, is so positioned to cause the scraper edge 92 to bear against the outer surface of the corrugated tube 66 as the roller rotates. The scraper blade 90 is so positioned to cause any aggregate removed from the surface of the roller to be discharged with the other aggregate from the bottom of the feed bin 10.

It is preferred that the fasteners 94 be nuts and bolts, with the usual washers and lock washers. By using these type of fasteners for the scraper blade 90 to the resilient arm 78, the scraper blade can be replaced easily when necessary.

A longitudinal, curved deflector plate 96 is also attached to the longitudinal bracket 76 by a plurality of fastening means 98. As best illustrated in FIG. 5, the deflector plate 96 is closely adjacent to, but not in contact with, the corrugated tube 66 of the roller 48. A similar deflector plate is associated with the roller 50. The deflector plate is useful in containing the aggregate within the bin and acts as a shield to reduce the likelihood that aggregate will become lodged between the roller and the resilient arm member 78 which would cause the scraper edge 92 to be pushed away from the surface of the roller.

The rollers are driven by a driving means 44, best illustrated in FIGS. 1 and 2. The driving means 44 includes a motor 100 which may be a variable speed electric motor, such as a five horsepower electric motor typically operating at speeds of up to 1800 rpm. If desired, any other suitable type of variable speed motor or engine could be used. The motor 100 drives V-belts 102 which, in turn, drive a sheave 104 attached to a shaft leading to a speed reducer 106. If desired, a chain or chains could be used in place of the V-belts 102. Correspondingly, a sprocket or sprockets could be used in place of the sheave 104. Extending from the speed reducer 106 is a shaft 108 having a double strand chain sprocket 110 at an end supported in a pillow block 111 mounted in any suitable manner, such as by fasteners or welding, to the lower front stabilizing member 24. An endless double strand drive chain 112 is driven by the sprocket 110 which rotates in a counterclockwise direction when viewed in the direction illustrated in FIG. 2. The drive chain 112 passes around an idler sprocket 114, then around the double strand chain sprocket 60 associated with the roller 48, and finally around the bottom portion of a double strand chain sprocket 61 associated with the roller 50 before passing around the sprocket 110.

Although a particular arrangement for a driving means has been illustrated and described herein, other equivalent, variable speed driving means could be used, if desired. Typical arrangements could include motors connected by appropriate shafts and gearing to the rollers, for example. It is important to be able to control the speed of the rollers, however, so that the rate of discharge of aggregate from the feed bin 10 can be controlled accurately. Typically, for a feed bin in which the bin housing 12 has dimensions about 6 meters (20 feet) long, 3.3 meters 11 feet) high, 3.3 meters (11 feet) wide at the top and 1 meter (3 feet) wide at the bottom, to accommodate about 32 metric (35 tons) dead weight of aggregate, the rollers can be rotated at speeds up to about 10 rpm to discharge up to about 200 tons per hour of aggregate from the feed bin using two rollers about 30 cm (12 inches) in diameter.

The adjustable proportioning means 46 for proportioning the amount of aggregate being discharged from the feed bin 10 will now be described with respect to the elements illustrated in FIG. 5 common to the two embodiments regardless of which of the different height adjusting means 47 or 49 is used. A proportioning beam assembly 116 is connected at either end as described hereinafter to either one of the two preferred types of adjusting means described hereinafter. One type of height adjusting means comprises a pair of screw jack assemblies 47, one of which is best illustrated in FIGS. 2 and 3. The other preferred adjusting means is a pair of hydraulic jack assemblies 49, one of which is best illustrated in FIG. 4.

With reference to FIG. 5, the proportioning beam assembly 116 includes a longitudinal tubular beam 118 to which a longitudinal deflector plate 120 is secured by a plurality of fasteners 122, preferably in the form of bolts with mating washers and nuts. Several reinforcing members 124 are connected by any suitable means between the sides of the tubular beam 118 and the sides of the deflector plate 120. The deflector plate 120 has curved sides to enhance the mass flow of aggregate between the surface of the rollers and the proportioning beam assembly 116. A top deflector angle member 126 is attached by welding or other suitable means to the top of the deflector plate 120 overlying the top wall of the tubular beam 118. The top deflector angle member 126 deflects aggregate material to either side of the proportioning beam assembly 116.

As illustrated in FIG. 5, the proportioning beam assembly is about one third of the way from the highest position that it can occupy with respect to the rollers 48 and 50. By raising the proportioning beam assembly 116 to its highest position, the space between the deflector plate 120 and the rollers 48 and 50 is minimized. In this highest position, the rollers can provide a grinding function to help break up clumped aggregate material, in addition to their dispensing function. In the lowest position, the space between the deflector plate 120 and the rollers 48 and 50 is greatest. This provides the freest flow of aggregate from the feed bin 10 and allows space for cleaning and replacing a worn top deflector angle member 126, when necessary.

As indicated above, there are two preferred embodiments of the means 46 for adjusting the height of the proportioning beam assembly 116, namely, the screw jack assemblies 47 and the hydraulic jack assemblies 49. The screw jack assemblies will be described with reference to FIGS. 2, 3 and 5, although the portion of the height adjusting means illustrated in FIG. 5 is common to both the screw jack assembly 47 and the hydraulic jack assembly 49. Initially, it should be clear that the proportioning beam assembly 116 is attached to one of the pair of the height adjusting means at the front and to the other of the pair at the rear of the feed bin 10. Since the front and rear height adjusting means should be of the same type, only one of the screw jack assemblies 47 and one of the hydraulic jack assemblies 49 will be described, the corresponding height adjusting means on the opposite end being substantially identical with the described embodiment.

With particular reference to FIG. 3, the screw jack assembly 47 comprises an internal support plate 128 to which the proportioning beam assembly 116 is attached by welding or other suitable means. The internal support plate 128 is located on the interior of the feed bin 10 adjacent to the front wall 14. An external support plate 130 is attached by welding or other suitable means to the front wall 14 of the bin and to a stationary support member 132. Reinforcing members 134 and a backing plate 135 are also attached to the stationary support member 132 which may form a portion of the framework or supporting structure for the bin housing 12. A pair of vertical slots 136 are formed in the front wall 14 and an aligned pair of vertical slots 138 are formed in the external support plate 130 for purposes to be set forth hereinafter.

A movable support member 140, reinforced by reinforcing members 142, is connected through the slots 136 and 138 to the internal support plate 128 by a plurality of fasteners 144, preferably in the form of bolts and nuts with the usual associated flat washers and lock washers. For adjusting the height of the proportioning beam assembly 116, the connection of the movable support 140 to the internal support plate 128 should be firm, yet allow vertical sliding motion of the internal support plate 128 against the front wall 14 of the bin. The fasteners 144 are tightened during operation of the feed bin.

The screw jack assembly 47 includes a threaded rod or screw 146 attached by nuts 148 and 150 to the movable support member 140. Thus, the screw 146 will not rotate. The screw 146 passes through a hole formed in the stationary support member 132 and the backing plate 135. Upper and lower adjustment nuts 152 and 154, respectively, may be turned to cause the screw 146, the attached movable support 140, the attached internal support plate 128 and the attached proportioning beam assembly 116 to move upwardly and downwardly with respect to the stationary support member 132. By turning the adjusting nuts 152 and 154 clockwise, the proportioning beam assembly 116 is raised. By turning the adjusting nuts 152 and 154 counterclockwise, the proportioning beam assembly 116 is lowered. Bolt, nut and washer assemblies 156 passing through the vertical slots 136 and 138 and through holes formed in the internal support plate 128 act as guide members as the height of the proportioning beam assembly 116 is raised or lowered. Once the appropriate height is determined, the bolt, nut and washer assemblies 156 are tightened to help retain the proportioning beam assembly 116 at that height. Fasteners 144 also should be tightened.

The hydraulic jack assembly 49 will now be described with reference to FIG. 4. Many of the components of the hydraulic jack assembly 49 are identical to those used with the screw jack assembly 47 and will not be described further with respect to this embodiment. The only substantial difference between the two embodiments is the use of different lifting means.

The hydraulic jack assembly 49 uses as a hydraulic cylinder 158 as the raising and lowering means. Thus, the cylinder 158 which is of a typical design includes a piston rod 160. The body of the cylinder 158 is attached by fasteners 162, by welding or other suitable means to the stationary support member 132. The movable piston rod 160 is attached to the movable support member 140 by a fastener 164 in the form of a bolt or the like. Hydraulic fluid lines 166 and 168 are connected to a typical hydraulic fluid pump, not shown. To raise the piston rod and the attached movable support 140, the attached internal support plate 128 and the attached proportioning beam assembly 116, hydraulic oil or other fluid is pumped into line 168 and out of line 166 which are located on opposite sides of a piston within the hydraulic cylinder 158. To lower the piston rod 160 and, accordingly, the proportioning beam assembly 116, hydraulic fluid is pumped into the cylinder through the line 166 and out of the cylinder through line 168 until the desired height is reached.

In operation, the aggregate contained in the feed bin 10 is discharged from the bottom of the bin from between the rollers 48 and 50 and the proportioning beam assembly 116 in a controlled manner having mass flow substantially throughout the length of the bin housing onto a conveyor, such as the schematically illustrated gathering conveyor belt 40. If desired, any other type of conveying means, including chutes, vibratory pans, or even vehicles, may receive the aggregate discharged from the bin housing 12 by the mass flow enhancing means used with the feed bin 10.

As indicated above, the feed bin 10 according to the present invention may be used to enhance mass flow of aggregate therefrom with any type of cold feed bin or heater bin. By controlling the speed of the rollers and the height of the proportioning beam assembly with respect to the rollers, aggregate of all types and sizes, including raw, virgin aggregate and RAP may be discharged from the feed bin steadily and efficiently. If a jam should occur, as a result of the inclusion of an oversize rock or other foreign object, it should be relatively easy to remove by lowering the proportioning beam assembly to its lowest point.

Moreover, when a plurality of feed bins including the mass flow features described with respect to the feed bin 10 are used together on a project, improved efficiencies in the project may be achieved. Thus, for example, a different size or type of aggregate can be included in each of several feed bins. The discharge rate of each can be controlled by controlling the speed of the rollers and the height of the proportioning beam assembly. The aggregate discharged from each of the bins may be fed at a predetermined rate by conveyors into a mixer, heater or other processor to achieve a predetermined design mix of aggregate substantially automatically.

In addition, the apparatus used to enhance mass flow in the bin 10 may be used to enhance the mass flow in heater bins according to other embodiments of the present invention to be described hereinafter.

Figure 6:
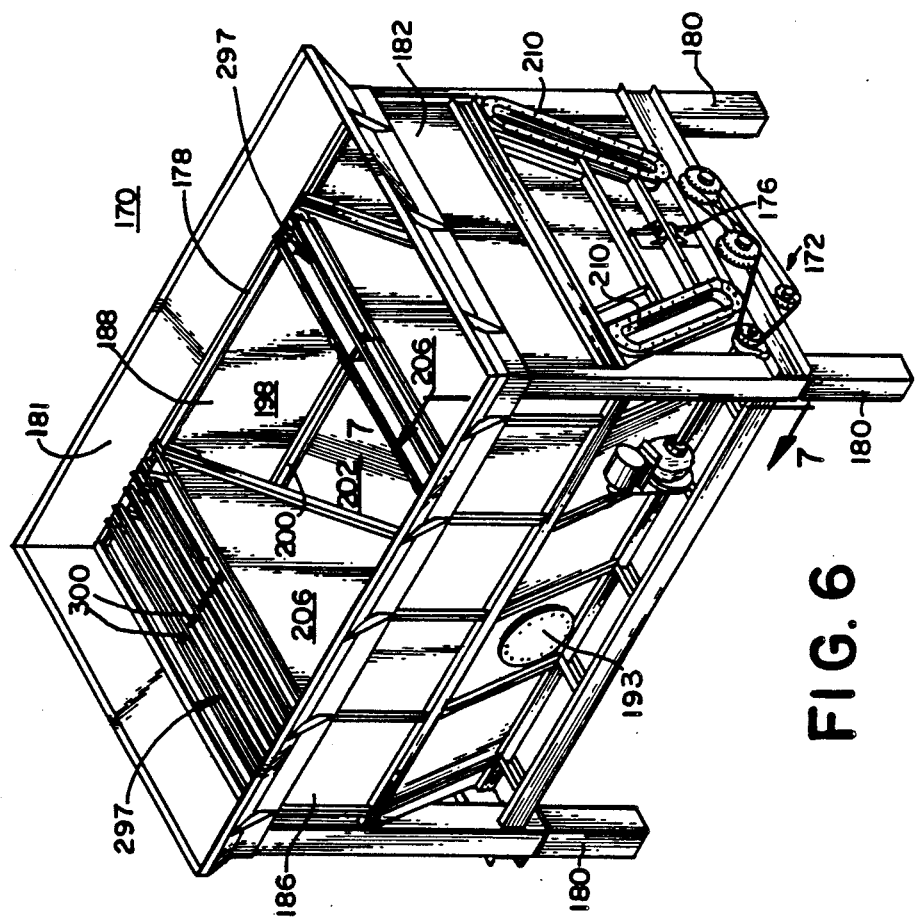
FIG. 6 is an isometric view of a heater bin for heating aggregate material further illustrating the optional use of the means for enhancing the mass flow of aggregate material therefrom as illustrated in FIGS. 1 through 5.
Figure 7:
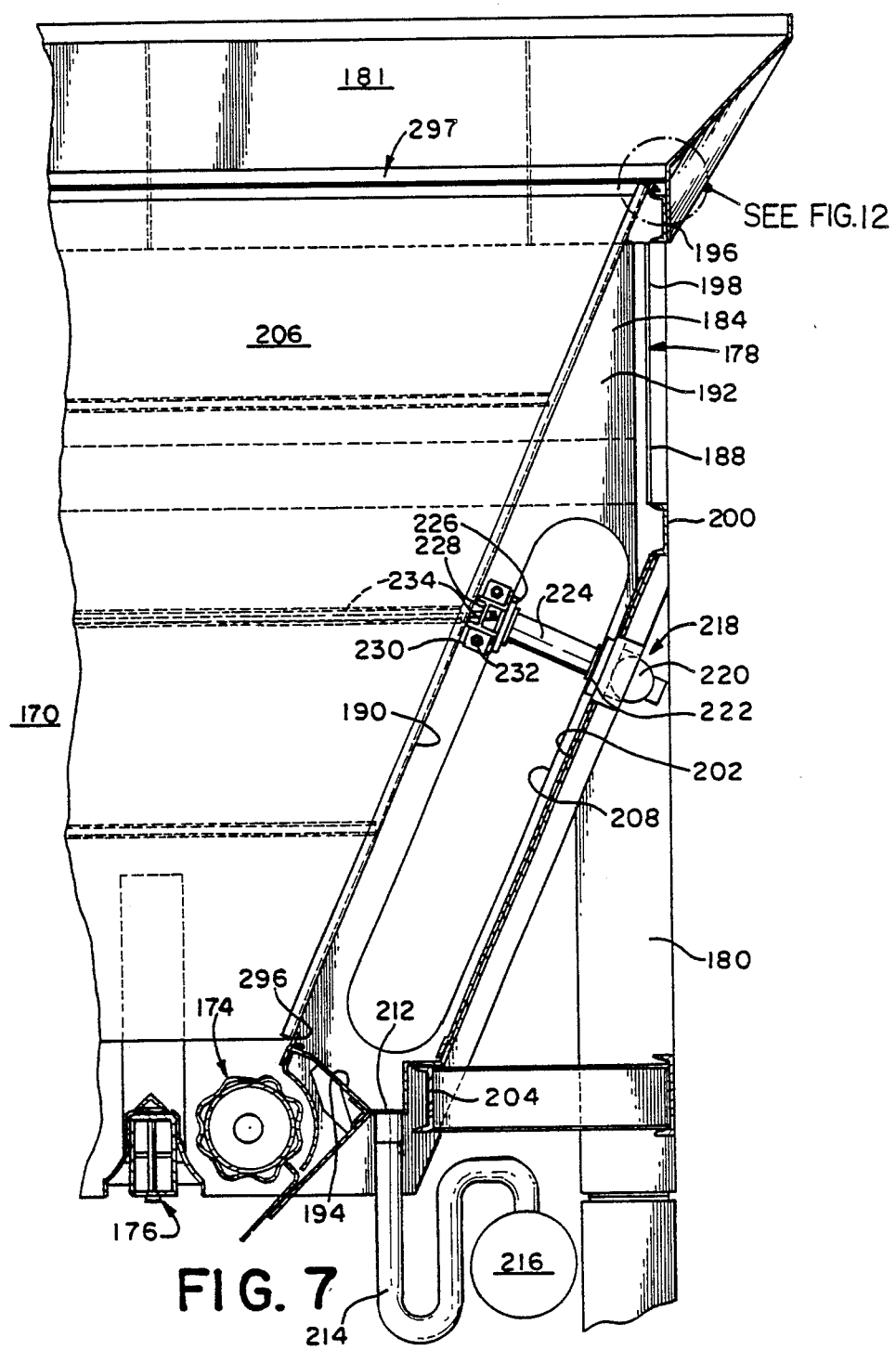
FIG. 7 is a vertical cross-sectional view of a portion of the heating bin taken along the lines 7—7 of FIG. 6.
Figure 8:
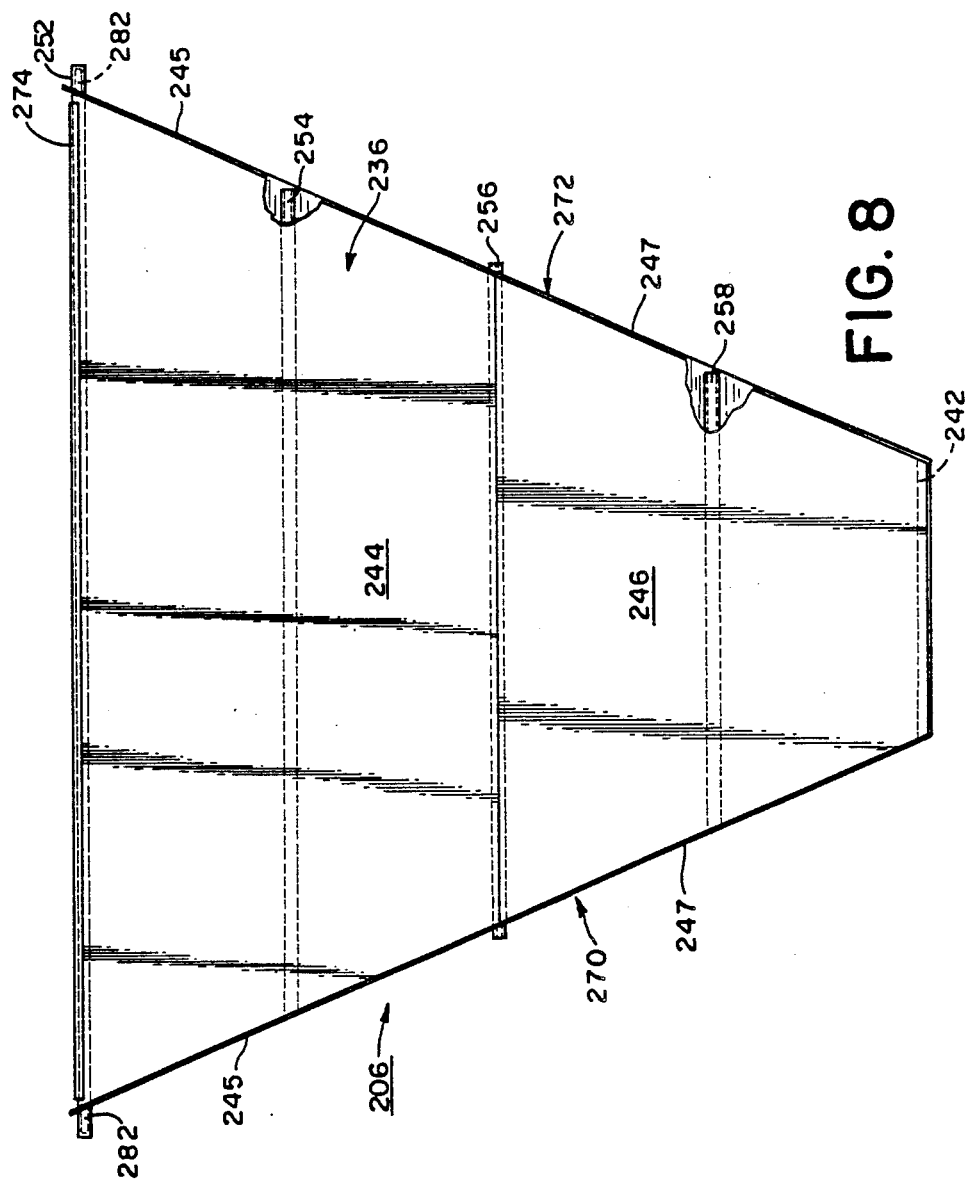
FIG. 8 is a front elevational view of a hollow heating plate for use in the heating bin of the present invention.

FIGS. 6 through 8 illustrate a novel heater bin 170 forming another aspect of the present invention. As indicated best in FIGS. 6 and 7, the heater bin 170 includes a driving means 172, a roller assembly 174 and an adjustable proportioning means 176 to provide enhanced mass flow of heated aggregate from the heater bin 170. It is important to have an effective means for enhancing mass flow from the heater bin 170 in view of the restricted space between heat exchange plates located within the heater bin. Without effective mass flow of aggregate through the heater bin, the aggregate cannot be heated effectively. Nevertheless, although preferred, the use of the previously described driving means, roller assembly and adjustable proportioning means is not absolutely required in the heater bin 170.

With reference particularly to FIGS. 6 and 7, the heater bin 170 includes a bin housing 178 supported by vertical support members or legs 180 attached to the bin housing 178 by any suitable means, such as by welding. If desired, an optional upper wing wall assembly 181 may be attached to the bin 170. The wing wall assembly 181 is constructed in a manner corresponding to the wing wall assembly 32 of the feed bin 10 illustrated in FIG. 1 and described in detail hereinbefore. Accordingly, a detailed description of the wing wall assembly 181 is not believed to be necessary.

The bin housing includes a front wall 182 and rear wall 184 to which are connected opposed outer side walls 186 and 188 which are spaced outwardly from inner side walls, only one of which is shown in FIG. 7 as inner side wall 190. Since the inner side walls are separated from the outer side walls, a chamber 192 is formed between them. An access opening covered by a removable cover 193 bolted to a flange extending from the outer side wall 186 around the opening allows access to the chamber. A similar access opening and removable cover preferably are associated with the outer side wall 188.

Each chamber 192 formed between the outer side wall 188 and the inner side wall 190 includes a bottom wall 194 attached to the outer and inner walls 188, 190 by welding, fasteners or other suitable means.

As best illustrated in FIG. 7, the outer wall 188 is formed from a plurality of components including an upper channel member 196, an upper plate 198, an intermediate channel member 200, a lower plate 202 and a lower channel member 204. The upper plate 198 and lower plate 202 are attached by any suitable means, such as by welding, nuts and bolts or the like to the respective channel members. The inner side wall 190 is formed from a plurality of channel members bolted between flanges formed on the sides of hollow heat exchange plates 206 contained within the bin housing 178 in a manner described hereinafter. Until all of the hollow heat exchange plates 206 are placed within the bin housing 178, the inner side wall 190 will not have been completely formed. Accordingly, for clarity of illustration, many of the hollow heat exchange plates 206 are not illustrated in FIG. 6.

The chamber 192 is a sealable chamber when all of the walls have been constructed. At each end of the chamber, an opening 208 is formed in the front wall 182 and the rear wall 184. When the heating bin 170 is used as a stand-alone unit, typically, the openings 208 are sealed by removable covers (not shown) attached to flanges 210 surrounding the openings 208 and extending from the exterior surfaces of the front wall 182 and the rear wall 184. By removing one or more of the covers, a plurality of heating bins 170 can be interconnected in series or in parallel by conduits having connection flanges corresponding with the connection flanges 210. In addition, other devices, such as a direct fired burner, for example, may be secured to the bin or may be remote from the bin, in either case having an outlet in fluid communication with at least one of the chambers 192 through the opening 208. In that instance, the chamber 192 connected to the outlet of the heater (not shown) would act as an inlet manifold, while the chamber on the opposite side of the bin would act as an outlet manifold.

In a preferred use of the heating bins 170, the chambers 192 would most likely contain water vapor, hydrocarbon gases and other components which would be likely to condense therein. Accordingly, in the preferred embodiment illustrated in FIG. 7, a condensate outlet 212 is provided in the bottom wall 194 of the chamber 192. A conduit 214, which preferably has a serpentine trap bend in it, connects the condensate outlet 212 with a condensate drain pipe 216. The condensate travels through the drain pipe 216 to a treatment facility, if necessary, for example to remove hydrocarbons from the condensate, or otherwise to an effluent discharge point.

In the preferred embodiment of the heating bin 170 illustrated in FIGS. 6 and 7, a plurality of vibrator assemblies 218, preferably two, are attached to one outer side wall 188 of the heater bin 170. Each vibrator assembly preferably includes an electric vibrator 220, such as those available from Martin Engineering Company.

As best illustrated in FIG. 7, the vibrator 220 is bolted or otherwise suitably mounted on a mounting plate 222 which is mounted on the outer side wall 188 of the bin housing 178. A pipe or bar 224 is bolted, welded or otherwise attached at one end to the mounting plate 222 and at the other end to a mounting plate 226. The mounting plate 226 is bolted, welded or otherwise attached to a waler beam 228 in the form of a longitudinal I-beam. The waler beam is mounted on the front and rear walls 182 and 184 by brackets 230 and fasteners 232. Thus, a waler beam extends from the front to the back of the bin along both sides of the bin within the chamber 192 defined by the outer side wall 188 and the inner side wall 190. A rod 234 extends transversely from side to side through the bin and, preferably, through a tube within the hollow heat exchange plate 206. One end of the rod 234 is threaded and connected by a nut to the waler beam 228. The opposite end of the rod 234 is likewise connected to a corresponding waler beam attached to the bin housing 178 as described above.

In the presently preferred embodiment, eight rods 234, generally spaced along the length of the heater bin, extend from side to side with their ends attached to the longitudinal waler beams 228. The vibrators are helpful in assisting the mass flow of aggregate through the heater bin 170 in view of the relatively small space, on the order of about 8.9 cm (3½ inches), between each of the hollow heat exchange plates 206. The vibrators also enhance the indirect heat transfer from the hollow heat exchange plates 206 to the aggregate by improving the flow of the aggregate from the top to the bottom of the heater bin 170.

The hollow heat exchange plates 206 will now be described with primary reference to FIGS. 8 through 11.

Figures 9, 10, 11:
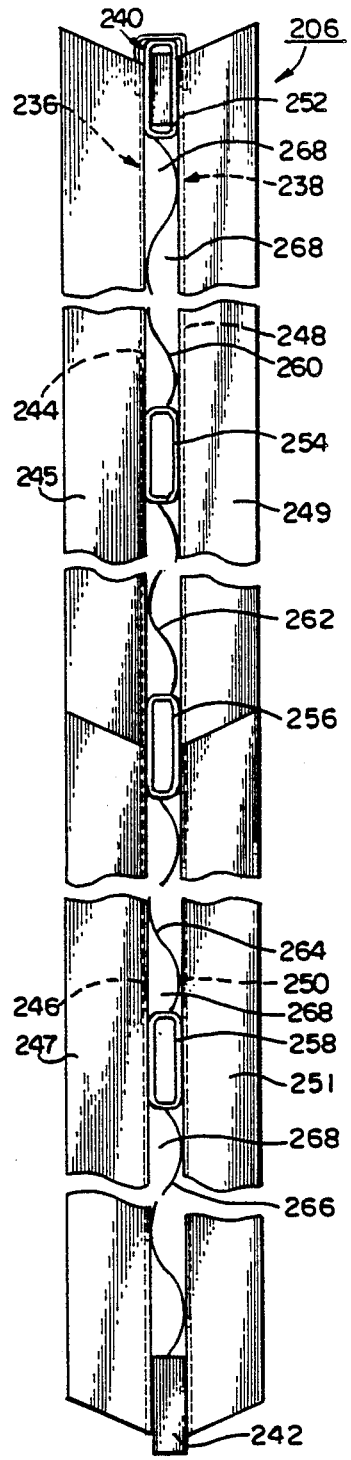
FIG. 9 is a right side elevational view, partially broken away, of the hollow heating plate illustrated in FIG. 8.
FIG. 10 is an enlarged side elevational view of the upper portion of the hollow heating plate as illustrated in FIG. 9.
FIG. 11 is an enlarged side elevational view of an intermediate portion of the hollow heating plate illustrated in FIG. 9.

With reference to FIGS. 8 and 9, the hollow heat exchange plate 206 includes a first or front major surface 236 and an opposed second or rear major surface 238. The front and rear major surfaces generally extend through the width of the heater bin 178 between the inner side walls 190. The front and rear major surfaces 236, 238 are attached by welding, adhesive bonding or by mechanical fasteners to a top wall member 240 comprising a tube, bar and cap channel member assembly described hereinafter. Likewise, the front and rear major surfaces 236, 238 are welded, adhesively bonded or mechanically fastened to a bottom wall comprising a bar 242. As indicated in FIG. 9, a side elevation view from the right side of FIG. 8, the side ends of the hollow heat exchange plate 206 are open.

The front major surface comprises a top plate 244 and a bottom plate 246 having edges which abut each other approximately in the middle of the hollow heat exchange plate 206. The rear major surface 238 comprises a top plate 248 and a bottom plate 25 likewise having edges which abut each other approximately in the middle of the hollow heat exchange plate. Integrally formed with each of the plates forming the front and rear major surfaces 236 and 238 are flanges extending substantially at right angles to the major surfaces for purposes of constructing the inner side walls 190 of the bin housing 178 as described hereinafter. The top plate 244 includes flanges 245. The bottom plate 246 includes flanges 247. The top plate 248 includes flanges 249 and the bottom plate 250 includes flanges 251. It is preferred that the plates used to make the hollow heat exchange plates 206 are galvanized sheet steel to resist corrosion. The top and bottom plates 244, 248 and 246, 250, respectively, preferably are formed from 0.9 mm (20-gauge) galvanized sheet steel.

Typical dimensions, for example, for the hollow heat exchange plate 206 are about 2.7 meters (9 feet) high, about 3.3 meters (11 feet) from side to side at the top and about 1 meter (3 feet) from side to side on the bottom. The hollow heat exchange plates typically have an external thickness of from about 9.5 mm (⅜ inch) to about 19 mm (¾ inch), and, preferably, about 16 mm (5/8 inch).

An internal support or strengthening structure is necessary to provide sufficient strength to the hollow heat exchange plates 206 so that they are not crushed by the weight of the aggregate in the heater bin 170. One type of internal strengthener is provided by a plurality of horizontally oriented, generally rectangular tubes welded, adhesively bonded or mechanically fastened to the inner surfaces of the front and rear major surfaces 236, 238. Preferably, there are four such tubes, a top tube 252, an intermediate tube 254, a middle tube 256 and a bottom tube 258. The edges of the top and bottom plates 244, 248 and 246, 250, respectively, abut each other at and are fastened to the middle tube 256.

The internal strengthening structure for the hollow heat exchange plates also includes a plurality of corrugated galvanized sheets, preferably having a thickness of 0.7 mm (22-gauge). Preferably, four such sheets are secured within the space between the first and second major surfaces 236 and 238. As best illustrated in FIGS. 9 and 10, a corrugated sheet 260 is placed between the top tube 252 and the intermediate tube 254. A corrugated sheet 262 is placed between the intermediate tube 254 and the middle tube 256. A corrugated sheet 264 is placed between the middle tube 256 and the bottom tube 258. A corrugated sheet 266 is placed between the bottom tube 258 and the bottom wall in the form of the bar 242. The corrugated sheets are attached to the inner surfaces of the front major surface 236 and the rear major surface 238 by welding, adhesive bonding, or mechanical fasteners. In the presently preferred embodiment, the corrugated sheets are secured to the first and second major surfaces by rivets spaced about 30 cm (12 inches) apart. The rivets do not adversely interfere with the flow of aggregate through the spaces between the hollow heat exchange plates 206, and provide for a relatively low manufacturing cost for the hollow heat exchange plates.

By using the corrugated sheets, a plurality of substantially horizontal passageways 268 extend from the left end 270 of the hollow heat exchange plate to the right end 272 of the hollow heat exchange plate. For example, the left end 270 may be an inlet end for heat exchange fluid entering the hollow plate and the right end 272 may be an outlet end for heat exchange fluid exiting the plate. Any condensate formed within the hollow heat exchange plate 206 generally would flow out of the plate in the direction of the gas flow, for example, from the outlet end 272. The tubes 254, 256 and 258 also aid in the flow of the heat exchange fluid from the inlet end 270 to the outlet end 272.

As previously described, the top wall member 240 of the hollow heat exchange plate 206 preferably includes a multiple component assembly, best illustrated in FIG. 10. In addition to the top tube 252, the top wall member 240 also includes a cap channel member 274 having a top portion 276 including an integral depending flange 278 overlying the top edge of the top plate 244 and an opposed, integral depending flange 280 overlying the top edge of the top plate 248. By using the cap channel member 274, the upper edges of the top plates 244 and 248 are not exposed to the abrasive or otherwise damaging action of the aggregate between the heat exchange plates.

Figure 12:
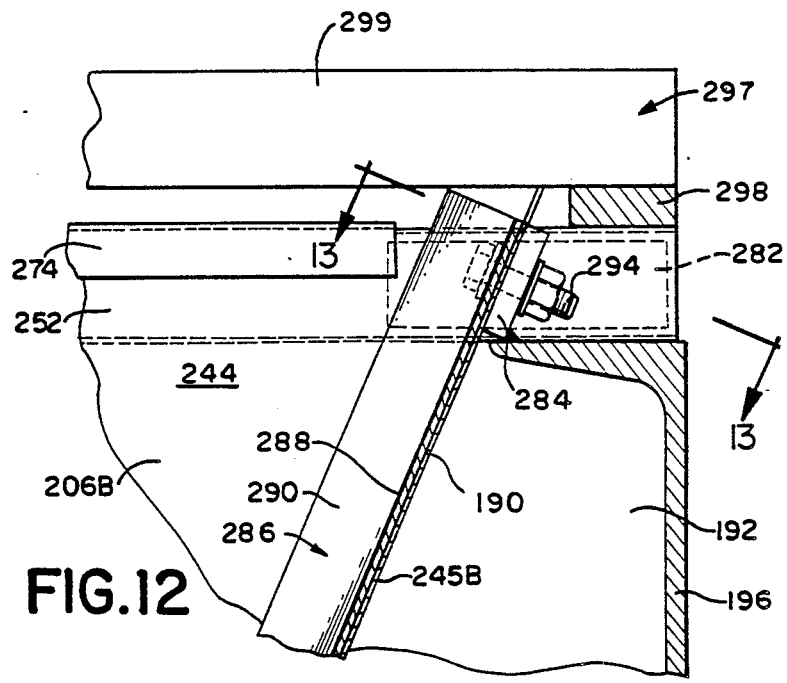
FIG. 12 is an enlarged detail of the portion of the heating bin of FIG. 7 indicated by the circled area in FIG. 7 referring to FIG. 12.
Figure 13:
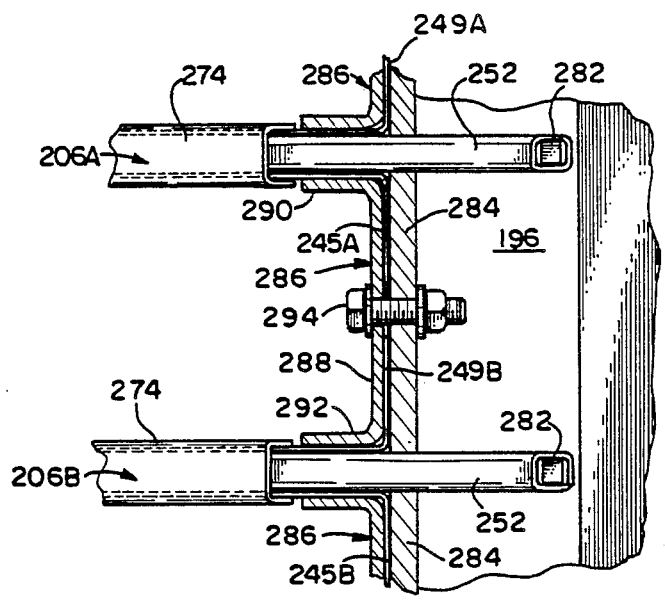
FIG. 13 is an oblique cross-sectional view of a portion of the heating bin taken along lines 13—13 of FIG. 12.

A solid bar of metal, preferably of galvanized carbon steel, having dimensions of about 12.7 mm (½ inch) wide, 38 mm (1 ½ inches) high and about 92 mm (3 5/8 inches) long, is inserted in each end of the top tube 252 to provide additional strength to support the heat exchange plate 206 within the heater bin housing 178. As best indicated in FIGS. 8, 12 and 13, the ends of the top tube 252, containing the bar 282, extend beyond the side edges or ends 270, 272 of the heat exchange plate 206. The extended portions of the top tube 252 are supported by the upper surface of the upper channel members 196 forming a portion of the support structure and outer side wall 188 of the bin housing 178.

The interconnection of hollow heat exchange plates to each other and the concurrent formation of the inner side wall 190 of the heater bin housing 178 will now be described with reference particularly to FIG. 12 and to FIG. 13 in which two adjacent hollow heat exchange plates 206A and 206B are joined together.

A solid steel bar 284 acts as a backing and support bar for joining together adjacent heat exchange plates 206A and 206B. As best illustrated in FIG. 13, the flange 245A of the front major surface of heat exchange plate 206A and the flange 249B of the rear major surface of the heat exchange plate 206B are placed adjacent to the bar 284. An extended wall channel member 286 having a central web 288, and integrally formed opposed front and rear flanges 290 and 292, respectively, is placed against the side of the flanges 245A and 249B opposite the sides adjacent to the bar 284. A nut, bolt and washer assembly 294 passing through holes formed in the bar 284 and in the wall channel member 286 clamps the flanges 245A and 249B of adjacent heat exchange plates 206 between the bar 284 and the wall channel member 286.

The bottom portion of the wall channel member 286 clamps the flanges 247 and 251 of the respective bottom plates of the front and rear major surfaces to an angle member 296 (see FIG. 7) attached to the bottom wall 194 of the chamber 192. In the presently preferred embodiment, a threaded stud extending from the bottom of the wall channel member 286 and through a hole formed in the angle member 296 where washers and a nut secure the stud to the angle member 296 is a presently preferred clamping means.

The wall channel members 286, extending between each of the heat exchange plates 206 and between the heat exchange plates 206 and the front and rear walls 182 and 184, respectively, of the bin housing 178, form the inner side wall 190 of the bin housing 178.

In installing the hollow heat exchange plates 206 in the heating bin 170, it is presently preferred to lower a completed heat exchange plate 206 into the bin so that the bar 282 is supported on the upper surface of the upper channel member 196 as best illustrated in FIG. 12. Thereafter, the bar 284 may be welded to the top of the upper channel member 196. Also thereafter, the fasteners 294 and the stud fasteners at the bottom of the channel members can be loosened and a suitable sealant may be coated between the flanges of the heat exchange plates 206, the bar 284, the wall channel member 286 and the angle member 296 to provide for a more effective sealable chamber 192. If desired, other clamping fasteners similar to the bolt, washer and nut assembly 294, with or without a backing plate or bar, may be inserted through holes formed in the wall channel member 286 along its length. After the sealant is applied, all of the fasteners are tightened.

After all of the heat exchange plates 206 have been installed within the heater bin 170, a protective grating 297 is applied over the top of the heat exchange plates 206. If desired, a plurality of separate gratings 297 can be used. The gratings protect the upper surfaces of the heat exchange plates 206 from damage caused by aggregate being loaded into the heater bin 170.

As best illustrated in FIG. 12, the grating 297 includes a support bar 298 extending lengthwise from the front to the back of the bin. A plurality of transverse grating bars 299 so arranged that each bar 299 is aligned with and overlies the heat exchange plates 206 are welded to the bars 298. Central spacers 300 preferably are welded between and in the center of adjacent bars 299.

Most often, the heater bin 170 is used with an open top. The heater bin 170 may be used to preheat aggregate as described with reference to the systems of FIGS. 14, 15 and 16. The heater bin 170 may also be used as a primary aggregate heater, if desired. In this case, it is preferred that a fossil fuel burner, such as a gas or oil burner, is attached directly to the bin housing or otherwise placed in communication with the bin housing such that the hot combustion heating gases from the burner are directed into one of the chambers 192 through one of the chamber openings 208. The cover over the opening 208 is removed and the gas outlet for the burner is connected to the flange 210 surrounding the opening 208. Suitable support structures and connecting means would be well known to those skilled in the art.

An exhaust duct could likewise be connected to the other of the flanges 210 surrounding the opening 208 from what would be the combustion gas exhaust chamber 192. When the heater bin 170 is used as a primary aggregate heater, it may be desirable that the heater bin 170 have a cover including a conduit for ducting the water vapor and other volatile material evaporated from the aggregate from the bin. The heat value of exhausted combustion gases and/or the evaporated water vapor and other volatile material may be used individually or together in an energy efficient processing system.

Having described the preferred embodiment of a heater bin 170 according to the present invention, preferably including the aggregate mass flow enhancing components described with respect to the feed bin 10, several preferred embodiments for using these components in efficient systems for heating aggregate, particularly for use in making HMA, will now be described with reference to FIGS. 14, 15 and 16, schematic block diagrams representative of processes using various components of this system and their interconnection.

Figure 14:
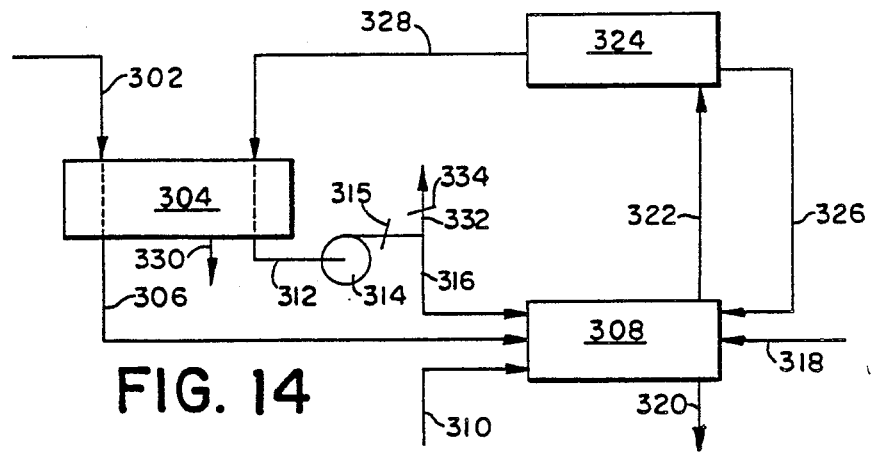
FIG. 14 is a block flow diagram illustrating diagrammatically one embodiment of a system for heating aggregate and/or for producing HMA in accordance with the present invention.

FIG. 14 diagrammatically illustrates one embodiment of a system for heating aggregate for producting HMA according to the present invention. The description of FIG. 14 relates to a fairly typical design capacity of 325 metric tons per hour (mtph) (365 tons per hour (tph)) of HMA produced. The numerical values relating to the heat balance and other parameters used in FIG. 14, as well as FIGS. 15 and 16, are based on the initial assumptions indicated, empirical data and calculations based thereon in view of standard thermodynamic principles, rather than actual testing of systems constructed as diagrammed in FIGS. 14 through 16. Nevertheless, the values presented are believed to be accurate and in accordance with accepted thermodynamic principles.

With respect to the system of FIG. 14, to produce HMA at the indicated rate, aggregate, which may be raw virgin aggregate or a mixture of raw virgin aggregate and RAP, containing an assumed 5% water content by weight at an ambient temperature of 21° C. (70°

F.), is charged by a loader indicated by the arrow 302 at a rate of 311,260 kg/hr (686,200 lbs/hr), corresponding to a water charging rate of 16,556 kg/hr (36,500 lbs/hr), into a plurality of heater bins 304. It is most preferred that the heater bins 304 be constructed in accordance with the heater bin 170 described herein with respect to FIGS. 6 through 13. However, other types of heater bins may be used, if desired, such as those used in the inventor's prior systems referred to hereinbefore. The calculations set forth herein are based upon the use of heater bins 304 having the construction of the previously described heater bin 170.

Preferably, the heater bins 304 are a plurality of individual heater bins connected in parallel, with each heater bin serving to heat a different size or type of aggregate. In this case, especially where the heater bin includes the mass flow enhancing apparatus described hereinbefore, any predetermined mix of different types of aggregate could be provided by controlling the driving means and adjustable proportioning means of the mass flow enhancing means. The necessary parameters can be controlled efficiently by various sensors and circuitry in turn preferably controlled by a computer which could be programmed readily by one of ordinary skill in the art.

As will be made clear hereinafter, the hollow heat exchange plates within the heater bin contain condensing steam at a temperature of about 100° C. (212° F.). As the aggregate contacts the hot heat exchange plates, the heat from the condensing steam is indirectly transferred through the walls of the heat exchange plates to the aggregate to increase the temperature of the preheated aggregate to a discharge temperature of about 65° C. (150° F.). The preheated aggregate is discharged from the heater bins 304 onto a conveyor 306.

About 10% to about 20% of the original water or moisture in the aggregate will evaporate to atmosphere as the aggregate travels from the heater bins 304 to a heater 308. Preferably, the heater 308 is in the form of a direct fired drum mixer. In view of the evaporation of water in the heater bins 304, the aggregate and remaining water will be charged into the drum mixer 308 at a rate of 311,260 kg/hr (686,200 lbs/hr) of aggregate and 14,900 kg/hr (32,850 lbs/hr) of water.

For the drum mixer burner to operate efficiently, fuel is supplied to the burner along with 340 actual cubic meters per minute (acmm) (12,000 actual cubic feet per minute (acfm)) of air at the ambient temperature of 21° C. (70° F.) through air supply conduit 310. The air supplied for combustion generally contains about 10% to about 20% in excess of the stoiciometric amount of air required for combustion.

A secondary gas required for removing the moisture and gases from the interior of the drum mixer 308 and to complete the drying of the aggregate is recycled from the gas outlet of the heater bins 304 through a conduit 312, a fan 314 and a conduit 316 leading to the aggregate inlet end of the drum mixer 308.

During the operation of the drum mixer, a heat loss to atmosphere of 1 million kilogram-calories/hr (kcal/hr) (4 million BTU/hr) is expected. However, atmospheric losses are dependent upon the amount of insulation used.

Asphalt cement at a rate of 6% by weight based on the combined weight of the dry aggregate and asphalt cement, in this example, equivalent to a charging rate of 19,870 kg/hr (43,800 lbs/hr), is injected into the drum mixer 308 through a supply conduit 318. The asphalt cement is mixed in the drum mixer 308 with the dry aggregate and any dust recycled to the drum mixer 308 as described hereinafter.

At the discharge end of the mixer, the final HMA mix has a temperture of 138° C. (280° F.) and is discharged at a rate of 331,100 kg/hr (730,000 lbs/hr) onto a conveyor 320 or, alternately, the HMA can be discharged directly into a storage silo from which it is dispensed to trucks or other carriers for transportation to a job site.

As discharged, the HMA mixture contains 8.2 million kcal/hr (32.5 million BTU/hr) of heat.

Combustion gases, water vapor in the form of steam, and particulate materials are exhausted from the drum mixer 308 through an exhaust conduit 322 into a particulate removal apparatus 324, such as a baghouse or any other suitable particulate removal device. The particulate removal apparatus 324 removes the particulate material, including dust, fines and other suspended solid material from the exhaust, where such particulate material is recycled to the drum mixer 308 through a particulate return conduit 326.

The combustion gases and the steam are ducted from the particulate removal apparatus 324 at about 1,022 acmm (36,100 acfm) at 120° C. (250° F.) through a gas conduit 328 to the gas inlet chambers or manifolds of the heater bins 304. The gas entering the inlet chambers of the heater bins 304 contains about 8.4 million kcal/hr (33.4 million BTU/hr) of water as steam, with about 0.5 million kcal/hr (2.0 million BTU/hr) contained in the combustion gases.

As the gas stream passes through the cooler hollow heat exchange plates or other heat transfer components of the heater bins 304, the steam component of the gas condenses as does a portion of hydrocarbon gases present in the combustion gases. As the steam condenses, it transfers the latent heat of vaporization, 111 kilocalories per kilogram (kcal/kg) (970 BTU/lb) of steam, to the new feed aggregate. The condensing steam converts 2.6 liters per second (L/s) (42 gallons per minute (gpm)) of water at about 60° C. (140° F.) for a system using four heater bins 304. The condensate, which includes mostly water, but also some condensed hydrocarbons and particulates from the combustion gases, is discharged from the heater bins 304 through a conduit 330 to a storage tank, waste treatment facility or the like.

The gas stream exiting from the outlet chamber or manifold associated with the heat exchange plates or other heat transfer means of the heater bin 304 has a volume of about 600 acmm (21,400 acfm) at about 77° C. (170° F.). The gases are ducted through the conduit 312 to the inlet side of the fan 314. A system control damper 315 is located downstream of the fan 314 in the conduit 312. A portion of the gas is exhausted to the atmosphere through a stack 332 containing an exhaust control damper 334 at a rate of about 433 acmm (15,300 acfm) at 77° C. (170° F.). The volume of gas exhausted through the stack 332 should be equal to the volume of combustion air used for efficient burner operation entering the system through air supply conduit 310. The remaining gases are recycled through the conduit 316 to the inlet end of the drum mixer 308 at a rate of about 175 acmm (6,100 acfm) at 77° C. (170° F.). There are substantially less emissions of atmospheric pollutants through the stack 332 compared to prior art systems in view of the removal of particulates by the particulate removal means 324 and the condensation of hydrocarbon gases in the heater bins 304 which are removed through the condensate drain conduit 330.

Although the system of FIG. 14 is illustrated as being used in the preferred embodiment to make HMA by virtue of adding asphalt cement 318 to the drum mixer 308, if desired, heater 308 could be merely for the purpose of providing dry, heated aggregate for other purposes. In that case, no asphalt cement would be mixed with the aggregate in the heater 308.

The system illustrated and described with respect to FIG. 14 provides several substantial advantages and benefits. The system has a high productivity (mixing drum throughput) for each heat unit released inside the drum because the aggregate has been preheated using the heat of the gases exhausted from the drum mixer. A result is that a higher percentage of RAP can be mixed with raw virgin aggregate for an equivalent heat duty. Since less heat per ton is released inside the drum mixer, less hydrocarbons are released to the gas stream.

The saturation level of the gas stream inside the drum mixer with steam may be increased when compared to standard drum mixers without the recycling and treatment of exhaust gas of the present invention. Thus, without condensing the water vapor out of the exhaust gas, if the exhaust gas were to be recycled to the mixing drum, it could not retain any more moisture beyond its saturation level.

If desired, it is possible to move less air per ton of HMA mix produced using the system of the present invention because of the preheating effects. This would decrease the gas velocities within the drum mixer and, therefore, it is believed that less particulate matter and hydrocarbons would be exhausted from the drum mixer.

In view of the recycling of a portion of the exhaust gas to the drum mixer, the level of oxygen within the mixing drum could be reduced substantially. In a standard direct fired drum mixer system, the oxygen level is about 8% to about 12%. In the system of the present invention, the recycled carrier gas stream in the drum mixer is expected to include about 1% to about 4% oxygen, rendering the carrier gas stream substantially inert. This may help reduce the formation of hydrocarbon exhaust by reducing the oxidation of the asphalt cement and the HMA within the drum mixer.

The amount of atmospheric pollutants emitted by the system of the present invention is believed to be substantially less than the amount of atmospheric pollutants emitted from standard direct fired drum mixing plants. Even though some hydrocarbon gases would be produced in the direct fired drum mixer of the system of the present invention, they would be carried with the water vapor by the carrier gas through the baghouse and into the hollow heat exchange plates of the heater bin. There, the hydrocarbon gases would have a tendency to condense along with the water vapor. It is further believed that even less atmospheric hydrocarbon emission can be achieved by adding slight amounts of surfactants to the exhaust gas stream before the gas enters the heat exchange plates within the heater bin.

Still further, other additives to control particular types of emissions could be added to the exhaust gas stream before the exhaust gas stream enters the heat exchange plates within the heater bin. For example, injecting a mild lime solution spray would reduce the emission levels of sulfates.

Figure 15:
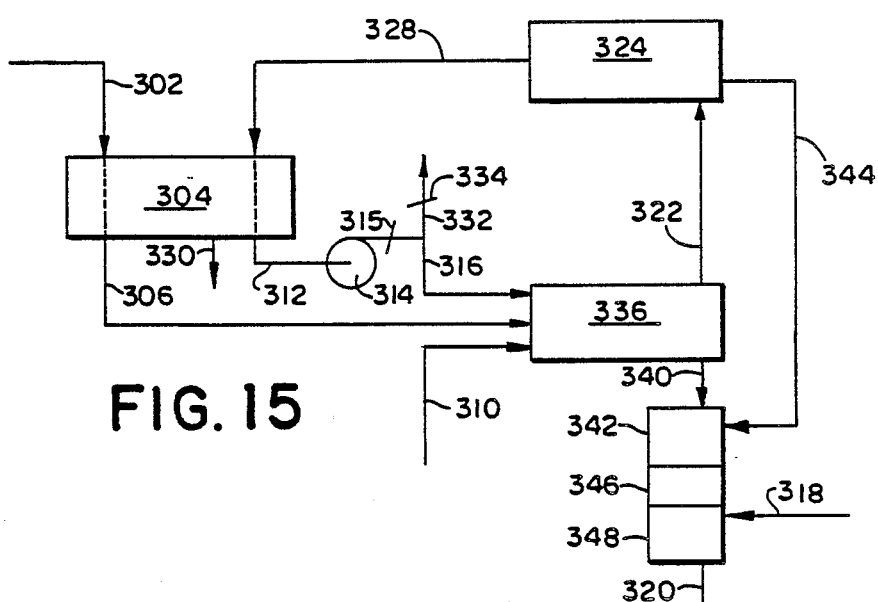
FIG. 15 is a block flow diagram illustrating diagrammatically an alternate embodiment of a system for heating aggregate and/or for producing HMA in accordance with the present invention.

FIG. 15 diagrammatically illustrates another embodiment of a system for heating aggregate and using the heated aggregate to make HMA according to the present invention. The components, operation of and heat balance associated with the system of FIG. 15 are similar to those of the system of FIG. 14, as indicated by the use of many of the same reference numerals.

The system of FIG. 15 differs from the system of FIG. 14 primarily by substituting for the drum mixer 308 in FIG. 14, an aggregate dryer 336 and the associated changes made necessary by such substitution. The preferred embodiment of the aggregate dryer 336 is a parallel flow, direct fired, rotary dryer. If desired, a counterflow, direct fired rotary dryer may be used as the dryer 336. In that case, the burner, the air supply line 310 to the burner and the recycled gas conduit 316 would be located at the right hand end of the block representing the dryer 336. The exhaust conduit 322 would be located at the left hand end of the block representing the dryer 336.

The dryer 336 dries and heats the aggregate charged by a loader 302. The aggregate, dried and heated to a temperature of about 138° C. (280° F.) is discharged at a rate of 311,260 kg/hr (686,200 lbs/hr) and conveyed by a conveyor 340 to a screening and batching tower 342 of standard construction. Particulate matter removed from the gases exhausted from the dryer 336 by the particulate removal apparatus 324 is recycled through particulate return conduit 344 to the screening and batching tower 342.

From the screening and batching tower 342, the heated aggregate is weighed in a standard weighing apparatus 346, such as a weigh hopper, and then is transferred to a pug mill mixer 348. Asphalt cement is added to the aggregate in the pug mill mixer 348 through asphalt cement supply conduit 318.

The HMA produced in the pug mill 348 is discharged from the pug mill onto a conveyor 320 or silo for later transportation to a job site as indicated in the system of FIG. 14.

Figure 16:
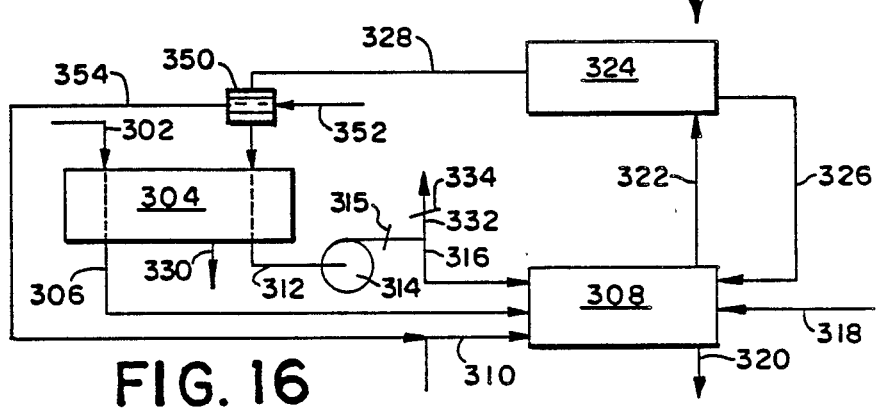
FIG. 16 is a block flow diagram illustrating diagrammatically still another embodiment of a system for heating aggregate and/or for producing HMA in accordance with the present invention.

FIG. 16 diagrammatically illustrates another embodiment of a system for heating aggregate and using the heated aggregate to make HMA according to the present invention. The system is similar in many respects to FIG. 14, as indicated by the use of common reference numerals. The primary difference between the systems of FIGS. 14 and 16 is the use of a gas/gas heat exchanger 350 between the gas stream exiting the particulate removal apparatus 324 and the heater bin 304.

In accordance with the system of FIG. 16, when the exhaust gases exit the particulate removal apparatus 324 through the gas conduit 328, the heat exchanger 350, which may be any standard gas/gas heat exchanger well known to those skilled in the art, is inserted in the gas conduit 328. Ambient air is supplied to the heat exchanger 350 by a combustion air supply conduit 352. The air stream heated by the hot exhaust gas in conduit 328 passes through a conduit 354 to the burner.

The use of the heat exchanger 350 improves the efficiency of the heater bins 304 and the system by reducing the temperature of the gases to the heater bins 304 and bringing the gases closer to the water vapor dew point (about 82°-100° C. (180°-212° F.)). The heat exchanged to the combustion air will increase the combustion intake air temperature. The addition will be most useful with respect to a parallel flow dryer, since a counter flow dryer, by design, has means to control the exhaust gas temperature closer to the dew point.

The present invention may be embodied in other specific forms without departing from the spirit or essential attributes thereof and, accordingly, reference should be made to the appended claims, rather than to the foregoing specification as indicating the scope of the invention.

I claim:

1. A feed bin for enhancing the mass flow of aggregate material therefrom comprising
   a bin housing for receiving the aggregate material and having opposed front and rear walls connected to opposed side walls, and an open bottom for discharging the aggregate material;
   a roller assembly comprising at least one roller mounted generally horizontally within the bin housing and adjacent to the bottom of the bin housing and being rotatably supported on the housing, the roller having a plurality of longitudinal chambers for receiving a portion of the aggregate material;
   driving means for rotating the roller to cause the aggregate material in the chambers of the roller to be discharged from the bottom of the bin housing;
   proportioning means supported from the bin housing generally horizontally alongside the roller for cooperating with the roller in controlling the discharge of the aggregate material from the bin in a mass flow, such that the aggregate material flows as a mass downwardly substantially throughout the length of the bin; and
   means for moving the proportioning means along a vertical plane.

2. A feed bin according to claim 1 wherein the roller assembly comprises a pair of rollers mounted generally horizontally adjacent to each other within and adjacent to the bottom of the bin, wherein the proportioning means is disposed between the rollers, and wherein the driving means rotates the rollers in opposite directions to cause the aggregate material to be discharged from between the rollers.

3. A feed bin according to claim 1 wherein the roller has a corrugated surface of alternating longitudinal ridges and grooves.

4. A feed bin according to claim 3 wherein the ridges and grooves are curved and smoothly joined together.

5. A feed bin according to claim 4 further comprising scraping means mounted on the bin for scraping material from the surface of the roller.

6. A feed bin according to claim 5 wherein the scraping means associated with the roller comprises a strip of resilient material mounted longitudinally adjacent to the roller, the strip having an edge which contacts the corrugated surface of the roller at a location where aggregate material adhering to the roller surface will be removed from the surface and discharged from the bottom of the bin before that area of the roller surface reaches an upper point of the rotary path of the roller.

7. A feed bin according to claim 1 wherein the driving means comprises a variable speed motor connected by a drive member to the roller, and control means for controlling the speed of the motor.

8. A feed bin according to claim 1 wherein the proportioning means is mounted adjacent to the bottom of the bin and adjacent to the roller and being supported by a vertically adjustable mounting assembly, the mounting assembly including a stationary support secured to each of the front and rear walls, a movable support secured to the proportioning means and the means for moving the proportioning means along a vertical plane comprising a raising and lowering means secured to the stationary support and to the movable support to raise and lower the proportioning means with respect to the roller to thereby control the amount of aggregate material passing between the roller and the proportioning means to be discharged from the bottom of the bin housing.

9. A feed bin according to claim 8 wherein the raising and lowering means comprises a hydraulic assembly including a hydraulic cylinder secured to the stationary support, a piston reciprocable by hydraulic fluid within the cylinder, and a piston rod attached at one end to the cylinder and the other end to the movable support, the movable support having an internal portion within the bin attached to the proportioning means and an external portion outside of the bin to which the other end of the piston rod is attached, the internal and external portions of the movable support being connected by fasteners extending through vertical slots in the front and rear walls.

10. A feed bin according to claim 1 further comprising a plurality of hollow heat exchange plates supported vertically within the bin housing and adapted to contain heat exchange fluid for exchanging heat with the aggregate in the bin housing, the heat exchange fluid being heated by heating means in communication with heat exchange fluid inlet manifold means for distributing the heat exchange fluid to the hollow plates, and heat exchange fluid outlet manifold means for receiving heat exchange fluid from the hollow plates.

11. A heater bin for heating aggregate material, comprising
   a bin housing having opposite vertical end walls and opposite side walls connected to the end walls, at least one side wall having a lower portion sloping downwardly and inwardly to a discharge opening extending between the end walls;
   a plurality of heating plates extending from one side wall to the other side wall and secured in the bin housing in spaced apart relation;
   discharge means supported from the housing at the discharge opening and extending longitudinally between the end walls generally transverse to the heating plates for moving aggregate through the bin housing and through the discharge opening in a mass flow, such that the aggregate material flows as a mass downwardly substantially throughout the length of the bin.

12. A heater bin for heating aggregate material comprising
   a bin housing having opposed front and rear walls connected to opposed first and second external side walls and to opposed first and second internal side walls, the internal side walls being spaced internally within the housing from the respective first and second external side walls to define a first chamber between the first internal and external side walls and a second chamber between the second internal and external side walls;
   a plurality of supports for supporting the bin housing to allow the aggregate material to be discharged from a bottom portion thereof;
   upper and lower support members attached to the supports for supporting a plurality of hollow heat exchange plates in a vertical orientation within the bin housing;
   a plurality of hollow heat exchange plates adapted to contain heat exchange fluid, each heat exchange plate including opposed major surfaces connected along top and bottom edges by top and bottom walls, respectively, opposed ends of the plate being open, such that a passageway is formed through the plates from the first chamber to the second chamber, flanges formed integrally with and extending generally perpendicularly outwardly from the major surfaces of each heat exchange plate at the open ends of the plate, the flanges of adjacent plates at each open end being connected together by separate spaced elongated members extending substantially along the entire height of the plates, the plurality of the separate elongated members forming the respective first and second internal walls of the bin housing, the elongated members each having an upper and lower end, the upper end being secured to the upper support member, the lower end being secured to the lower support member;

heating means for heating the heat exchange fluid;

an outlet for the heat exchange fluid formed in a wall of the second chamber; and circulating means for circulating the heat exchange fluid from the first chamber through the plates, the second chamber and the outlet.

13. A heater bin according to claim 12 further comprising shielding means for shielding the top wall of the plates from damage caused by aggregate being dumped into the bin, the shielding means being supported by the bin and overlying the top wall of the plates.

14. A heater bin according to claim 12 further comprising at least one spacing means on at least one major surface of the plate to space the plate from an adjacent plate or the front or rear bin wall.

15. A heater bin according to claim 12 further comprising condensate draining means associated with at least one of the chambers for draining condensate formed in the hollow heat exchange plates.

16. A heater bin according to claim 12 wherein the heating means is secured to the bin, the heating means having a heated heat exchange fluid outlet portion adjacent the first chamber.

17. A hollow heat exchange plate for use in a heat exchange bin in which heat is indirectly exchanged between a heat exchange fluid within the hollow plate and aggregate material in the bin, the hollow plate comprising first and second opposed major surfaces connected in a fluid-tight manner along top and bottom edges by top and bottom walls, respectively, opposed ends of the plate being open, with one end serving as an inlet for the heat exchange fluid and the opposite end serving as an outlet for the heat exchange fluid, internal strengthening means secured to inner surfaces of the major surfaces to strengthen the plate, the internal strengthening means comprising a corrugated member having alternating ridges and grooves extending longitudinally between the inlet end and outlet end of the plate in contact with the inner surfaces of the first and second major surfaces, the alternating ridges and grooves together with the inner surfaces of the major surfaces forming flow channels through which the heat exchange fluid flows from the inlet end to the outlet end of the hollow plate, and attaching means extending outwardly from the major surfaces to attach the plate to the bin.

18. A hollow heat exchange plate according to claim 23 wherein at least a portion of at least some of the ridges is attached to the inner surface of the first major surface and at least a portion of at least some of the grooves is attached to the inner surface of the second major surface.

19. A hollow heat exchange plate according to claim 17 wherein the first and second major surfaces have flanges integrally formed with and extending generally perpendicularly outwardly from the major surfaces at the open ends of the plate, the flanges extending substantially for the full height of the major surfaces of the open ends from the top to bottom edges of the plate.

20. Apparatus for heating aggregate comprising direct fired heating means for heating aggregate by directly contacting the aggregate with a heated gas, the heating means including a housing having an aggregate inlet, an aggregate outlet, a fresh combustion air inlet, a heating gas inlet and a heating gas outlet;

particulate removing means for removing particulate material from the heating gas exiting the heating means and including a heating gas inlet and a heating gas outlet;

aggregate preheating means for indirectly preheating the aggregate using the heat contained in the heating has exiting the heating means and passing through the particulate removing means, the aggregate preheating means comprising a bin and hollow heat exchange plates supported in the bin through which the heating gas passes, the hollow heat exchange plates having walls which contact the aggregate so as to indirectly preheat the aggregate, the hollow heat exchange plates each having a heating gas inlet and heating gas outlet;

a plurality of conduits serially connecting the heating gas outlets to the heating gas inlets through which the heating gas flows from the heating means through the particulate removing means, then through the hollow heat exchange plates of the preheating means and back to the heating means;

circulating means for circulating the heating gas through the plurality of conduits;

gas proportioning means associated with the conduit connecting the gas outlet of the hollow heat exchange plates and the gas inlet of the heating means for controlling bleed off of a portion of the circulating heating gas to atmosphere, the portion bled off to atmosphere being substantially equal to an amount of fresh combustion air entering the direct fired heating means; and a preheated aggregate conveyor means for conveying preheated aggregate from the preheater means to the heating means.

21. Apparatus for making hot mix asphalt according to claim 20 wherein the heating means is a hot mix asphalt drum mixer, the apparatus further comprising a source of asphaltic binder and a conduit connecting the source to the mixing drum.

22. Apparatus for making hot mix asphalt according to claim 20 further comprising mixing means for mixing the heated aggregate with sufficient binder to form hot mix asphalt, and heated aggregate conveyor means for conveying the heated aggregate from the heating means to the mixing means.

23. Apparatus for making hot mix asphalt according to claim 22 further comprising a screening means for sorting the heated aggregate into containers holding different size aggregate and weighing means for weighing batches of heated aggregate prior to conveying the heated aggregate to the mixing means.

24. In a method of making hot mix asphalt, the steps of:

(a) heating and drying aggregate in a rotating drum wherein exhaust gases are created;

(b) removing particulate matter from the exhaust gas;

(c) then directing the exhaust gas through vertically oriented heating plates in an aggregate pre-heating bin housing the bin housing having a length and width, the heating plates extending across the width of the bin housing;

(d) returning at least a portion of the exhaust gas from the heating plates to the rotating drum;

(e) moving aggregate vertically downwardly through the pre-heating bin housing along the heating plates in a mass flow where the aggregate is removed from the bin housing substantially along the entire length of the bin housing; and (f) feeding the pre-heated aggregate to the rotating drum.

25. A method according to claim 24 wherein the rotating drum is a direct fired aggregate heater drum.

26. A method according to claim 24 wherein the rotating drum is a mixing drum for mixing the aggregate and an asphaltic binder to make the hot mix asphalt.

27. A method according to claim 24 wherein the particulate matter is removed by passing the exhaust gas through a baghouse.

28. A method according to claim 24 further comprising the step of:

(g) feeding the heated aggregate to a mixer where it is mixed with an asphaltic binder to make hot mix asphalt.

29. A method according to claim 24 further comprising the step of:

(g) feeding the heated aggregate to a batching tower; and (h) feeding the aggregate from the batching tower to a mixer for mixing the aggregate with an asphaltic binder to make hot mix asphalt.

30. A heater bin for heating aggregate material comprising a bin housing having opposed front and rear walls connected to opposed first and second external side walls and to opposed first and second internal side walls, the internal side walls being spaced internally within the housing from the respective first and second external side walls to define a first chamber between the first internal and external side walls and a second chamber between the second internal and external side walls;

a plurality of supports for supporting the bin housing to allow the aggregate material to be discharged from a bottom portion thereof;

upper and lower support members attached to the supports;

a plurality of hollow heat exchange plates adapted to contain heat exchange fluid, each heat exchange plate including opposed major surfaces connected along top and bottom edges by top and bottom walls, respectively, opposed ends of the plate being open, the plates being vertically disposed substantially within the bin housing with the first and second major surfaces adjacent the opposed ends being connected to the respective first and second internal side wall such that a passageway is formed through the plates from the first chamber to the second chamber, the top wall comprising a bar member to which the opposed major surfaces are attached, the bar member having end portions extending beyond the open ends and being supported by the upper support members;

heating means for heating the heat exchange fluid; and circulating means for circulating the heat exchange fluid from the first chamber through the plates and into the second chamber.

31. A heater bin for heating aggregate material comprising a bin housing having opposed front and rear walls connected to opposed first and second external side walls and to opposed first and second internal side walls, the internal side walls being spaced internally within the housing from the respective first and second external side walls to define a first chamber between the first internal and external side walls and a second chamber between the second internal and external side walls;

a plurality of supports for supporting the bin housing to allow the aggregate material to be discharged from a bottom portion thereof;

a plurality of hollow heat exchange plates adapted to contain heat exchange fluid, each heat exchange plate including opposed major surfaces connected along top and bottom edges by top and bottom walls, respectively, opposed ends of the plate being open, the plates being vertically disposed substantially within the bin housing with the first and second major surfaces adjacent the opposed ends being connected to the respective first and second internal side wall such that a passageway is formed through the plates from the first chamber to the second chamber;

heating means for heating the heat exchange fluid;

circulating means for circulating the heat exchange fluid from the first chamber through the plates and into the second chamber;

a roller assembly comprising at least one roller mounted generally horizontally adjacent to the bottom of the bin housing and being supported by rotary bearings mounted on the front and rear walls, the roller having a plurality of longitudinal chambers for receiving a portion of the aggregate material;

driving means for rotating the roller to cause the aggregate material in the chambers of the roller to be discharged from the bottom of the bin housing; and adjustable proportioning means for proportioning the amount of aggregate being discharged from the bin housing, the proportioning means being mounted adjacent to the bottom of the bin and adjacent to the roller and being supported by a vertically adjustable mounting assembly, the mounting assembly including a stationary support secured to each of the front and rear walls, a movable support secured to the proportioning means and a raising and lowering means secured to the stationary support and to the movable support to raise and lower the proportioning means with respect to the roller to thereby control the amount of aggregate material passing between the roller and the proportioning means to be discharged from the bottom of the bin housing.

32. A heater bin according to claim 31 further comprising condensate draining means associated with at least one of the first and second chambers for draining condensate formed in the hollow heat exchange plates.

33. A heater bin according to claim 31 wherein the heating means is secured to the bin, the heating means having a heated heat exchange fluid outlet portion adjacent the first chamber.

* * * * *